US012558657B2

(12) United States Patent
Larsen et al.

(10) Patent No.: US 12,558,657 B2
(45) Date of Patent: Feb. 24, 2026

(54) FLUID MIXING SYSTEMS AND METHODS OF USE

(71) Applicant: Life Technologies Corporation, Carlsbad, CA (US)

(72) Inventors: Jeremy K. Larsen, Providence, UT (US); Clinton C. Staheli, Brigham City, UT (US); Brandon M. Knudsen, Hyrum, UT (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

(21) Appl. No.: 18/590,633

(22) Filed: Feb. 28, 2024

(65) Prior Publication Data

US 2024/0269628 A1 Aug. 15, 2024

Related U.S. Application Data

(63) Continuation of application No. 17/105,810, filed on Nov. 27, 2020, now Pat. No. 11,944,945, which is a (Continued)

(51) Int. Cl.
*B01F 27/2121* (2022.01)
*B01F 27/191* (2022.01)
(Continued)

(52) U.S. Cl.
CPC ........ *B01F 27/2121* (2022.01); *B01F 27/191* (2022.01); *B01F 27/213* (2022.01);
(Continued)

(58) Field of Classification Search
CPC .......................... B01F 35/3231; B01F 35/412; B01F 35/4121; B01F 27/213; B01F 27/80; B01F 33/86
See application file for complete search history.

(56) References Cited

U.S. PATENT DOCUMENTS 522,909 A 7/1894 Isaac
688,201 A 12/1901 Scopes et al.
(Continued)

FOREIGN PATENT DOCUMENTS

DE 202009005407 U1 9/2009
DE 102008058338 A1 5/2010
(Continued)

OTHER PUBLICATIONS

PE2E Search Translation for "JP2510872B2", 1996, 4 pages.
Prionics, "Efficient New Homogenization System," Mar. 1, 2012, 2 pages.

*Primary Examiner* — Marc C Howell

(57) ABSTRACT

A fluid mixing system includes a flexible bag having a first end, an opposing second end, and an interior surface bounding a compartment; a retainer coupled to the second end of the flexible bag, the retainer having a retention cavity formed thereon that communicates with the compartment of the flexible bag; and an elongated member having a first end rotatably coupled to the first end of the flexible bag and an opposing second end freely disposed within the retention cavity of the retainer so that the second end of the elongated member can rotate within the retention cavity relative to the retainer.

15 Claims, 16 Drawing Sheets

Related U.S. Application Data continuation of application No. 16/165,650, filed on Oct. 19, 2018, now Pat. No. 10,850,243, which is a continuation of application No. 15/066,751, filed on Mar. 10, 2016, now Pat. No. 10,118,141, which is a continuation of application No. 13/849,361, filed on Mar. 22, 2013, now Pat. No. 9,700,857.

(60) Provisional application No. 61/614,682, filed on Mar. 23, 2012.

(51) Int. Cl.

| | |
|---|---|
| ***B01F 27/213*** | (2022.01) |
| ***B01F 27/88*** | (2022.01) |
| ***B01F 27/91*** | (2022.01) |
| ***B01F 33/00*** | (2022.01) |
| ***B01F 35/32*** | (2022.01) |
| ***B01F 35/40*** | (2022.01) |
| ***B01F 35/41*** | (2022.01) |
| ***B01F 35/513*** | (2022.01) |
| *B01F 27/80* | (2022.01) |
| *B01F 35/31* | (2022.01) |
| *B01F 35/50* | (2022.01) |

(52) U.S. Cl.

CPC .............. *B01F 27/88* (2022.01); *B01F 27/91* (2022.01); *B01F 33/86* (2022.01); *B01F 35/322* (2022.01); *B01F 35/3231* (2022.01); *B01F 35/40* (2022.01); *B01F 35/4121* (2022.01); *B01F 35/513* (2022.01); *B01F 27/80* (2022.01); *B01F 35/31* (2022.01); *B01F 35/41* (2022.01); *B01F 35/4112* (2022.01); *B01F 35/514* (2022.01)

(56) References Cited

U.S. PATENT DOCUMENTS

| | | | | |
|---|---|---|---|---|
| 702,248 | A | 6/1902 | Russell et al. | |
| 782,935 | A | 2/1905 | Weathers et al. | |
| 921,796 | A | 5/1909 | Chambers, Jr. et al. | |
| 1,519,533 | A | 12/1924 | Charles et al. | |
| 1,733,244 | A | 10/1929 | Smith | |
| 2,082,769 | A | 6/1937 | Joseph et al. | |
| 2,082,796 | A | 6/1937 | Gaertner | |
| 2,592,904 | A | 4/1952 | Jackson | |
| 2,858,117 | A | 10/1958 | Girton | |
| 2,864,594 | A | 12/1958 | Martinek | |
| 2,905,451 | A | 9/1959 | Callanen et al. | |
| 2,958,517 | A | 11/1960 | Harker et al. | |
| 3,092,678 | A | 6/1963 | Ernst et al. | |
| 3,132,850 | A | 5/1964 | Puchalski | |
| 3,149,888 | A | 9/1964 | Lennon | |
| 3,322,401 | A | 5/1967 | Georges et al. | |
| 3,327,953 | A | 6/1967 | Krumholz, Sr. et al. | |
| 3,559,962 | A | 2/1971 | Enssle et al. | |
| 3,692,427 | A | 9/1972 | Risse | |
| 4,083,653 | A | 4/1978 | Stiffler | |
| 4,722,608 | A | 2/1988 | Salzman et al. | |
| 5,549,386 | A | 8/1996 | Pardo et al. | |
| 5,568,976 | A | 10/1996 | Gabriele et al. | |
| 5,570,956 | A | 11/1996 | Gabriele | |
| 5,618,107 | A * | 4/1997 | Bartsch ............... | B01F 35/4121 366/279 |
| 5,885,001 | A | 3/1999 | Thomas et al. | |
| 5,941,636 | A * | 8/1999 | Lu ....................... | B01F 35/4111 366/249 |
| 6,083,587 | A | 7/2000 | Smith et al. | |
| 6,089,746 | A | 7/2000 | Martin et al. | |
| 6,494,612 | B2 | 12/2002 | Johanson | |
| 6,494,613 | B2 | 12/2002 | Terentiev | |
| 6,670,171 | B2 | 12/2003 | Carll | |
| 7,252,429 | B2 | 8/2007 | Yungblut et al. | |
| 7,384,783 | B2 | 6/2008 | Kunas et al. | |
| 7,441,940 | B2 | 10/2008 | Vanek et al. | |
| 7,487,688 | B2 | 2/2009 | Goodwin | |
| 7,682,067 | B2 | 3/2010 | West et al. | |
| 7,878,099 | B2 | 2/2011 | Loibl et al. | |
| 7,879,599 | B2 | 2/2011 | Goodwin et al. | |
| 7,980,500 | B2 | 7/2011 | Jenni et al. | |
| 8,057,092 | B2 | 11/2011 | Ryan et al. | |
| 8,123,395 | B2 | 2/2012 | Baumfalk et al. | |
| 8,293,523 | B2 * | 10/2012 | Friedmann ............ | B01F 27/191 366/331 |
| 8,293,533 | B2 | 10/2012 | Falco et al. | |
| 8,342,737 | B2 | 1/2013 | Greller et al. | |
| 8,455,242 | B2 | 6/2013 | Staheli et al. | |
| 8,506,198 | B2 | 8/2013 | West et al. | |
| 8,603,805 | B2 | 12/2013 | Goodwin et al. | |
| 8,641,314 | B2 | 2/2014 | Thacker et al. | |
| 9,669,366 | B2 | 6/2017 | Reif et al. | |
| 9,700,857 | B1 | 7/2017 | Larsen et al. | |
| 9,839,886 | B2 | 12/2017 | Staheli et al. | |
| 9,855,537 | B2 | 1/2018 | Williams et al. | |
| 10,118,141 | B2 | 11/2018 | Larsen et al. | |
| 2002/0105856 | A1 | 8/2002 | Terentiev et al. | |
| 2002/0131654 | A1 | 9/2002 | Smith et al. | |
| 2002/0176322 | A1 | 11/2002 | Kupidlowski et al. | |
| 2003/0077466 | A1 | 4/2003 | Smith et al. | |
| 2004/0228209 | A1 | 11/2004 | Bielozer et al. | |
| 2005/0239199 | A1 | 10/2005 | Kunas et al. | |
| 2006/0215488 | A1 | 9/2006 | Blakley et al. | |
| 2006/0240546 | A1 | 10/2006 | Goodwin et al. | |
| 2006/0270036 | A1 | 11/2006 | Goodwin et al. | |
| 2006/0280028 | A1 | 12/2006 | West et al. | |
| 2008/0208234 | A1 | 8/2008 | Jenni et al. | |
| 2010/0177593 | A1 | 7/2010 | Takenaka et al. | |
| 2010/0178685 | A1 | 7/2010 | Kloss et al. | |
| 2010/0278007 | A1 | 11/2010 | Tanguy et al. | |
| 2011/0013473 | A1 | 1/2011 | Ludwig et al. | |
| 2011/0013474 | A1 * | 1/2011 | Ludwig ................... | B01F 27/88 366/140 |
| 2011/0026360 | A1 * | 2/2011 | Greller ................... | C12M 23/14 366/308 |
| 2011/0038222 | A1 | 2/2011 | Ludwig et al. | |
| 2011/0058447 | A1 * | 3/2011 | Reif .................... | B01F 33/4531 366/249 |
| 2011/0058448 | A1 | 3/2011 | Reif et al. | |
| 2011/0113473 | A1 | 5/2011 | Corda et al. | |
| 2011/0188928 | A1 | 8/2011 | West et al. | |
| 2011/0207218 | A1 * | 8/2011 | Staheli .................. | B01F 23/233 435/296.1 |
| 2011/0229963 | A1 | 9/2011 | Fatherazi et al. | |
| 2011/0310696 | A1 | 12/2011 | Goodwin et al. | |
| 2012/0175012 | A1 | 7/2012 | Goodwin et al. | |
| 2012/0282688 | A1 | 11/2012 | Knight et al. | |
| 2013/0044562 | A1 | 2/2013 | Selenius et al. | |
| 2013/0101982 | A1 | 4/2013 | Goodwin et al. | |
| 2014/0086006 | A1 | 3/2014 | Shramo et al. | |
| 2014/0106453 | A1 | 4/2014 | Kunas et al. | |
| 2015/0117138 | A1 | 4/2015 | Pozzan et al. | |
| 2015/0117142 | A1 | 4/2015 | Staheli et al. | |
| 2015/0151261 | A1 | 6/2015 | Isailovic et al. | |
| 2016/0151749 | A1 | 6/2016 | Seitz et al. | |
| 2016/0193576 | A1 | 7/2016 | Larsen et al. | |
| 2016/0333300 | A1 | 11/2016 | Kronenberg et al. | |
| 2017/0107471 | A1 | 4/2017 | Forsberg et al. | |
| 2017/0183617 | A1 | 6/2017 | Jones et al. | |
| 2017/0312713 | A1 | 11/2017 | Schöb et al. | |
| 2017/0362555 | A1 | 12/2017 | Damren et al. | |

FOREIGN PATENT DOCUMENTS

| | | | |
|---|---|---|---|
| EP | 0171496 | A2 | 2/1986 |
| EP | 1764154 | A1 | 3/2007 |
| EP | 2274084 | A2 | 1/2011 |
| EP | 2296795 | A1 | 3/2011 |
| EP | 2274084 | B1 | 12/2012 |
| FR | 782935 | A | 7/1935 |
| JP | H06285353 | A | 10/1994 |
| JP | 2510872 | B2 | 6/1996 |

(56) References Cited

FOREIGN PATENT DOCUMENTS

| | | | |
|---|---|---|---|
| WO | WO-8808327 | A1 | 11/1988 |
| WO | WO-2006116139 | A2 | 11/2006 |
| WO | WO-2007025739 | A2 | 3/2007 |
| WO | WO-2009115926 | A2 | 9/2009 |
| WO | WO-2009122310 | A2 | 10/2009 |
| WO | WO-2009143955 | A1 | 12/2009 |
| WO | WO-2011139209 | A1 | 11/2011 |

* cited by examiner

FLUID MIXING SYSTEMS AND METHODS OF USE

CROSS-REFERENCE TO RELATED APPLICATIONS

This application is a continuation of U.S. application Ser. No. 17/105,810, filed Nov. 27, 2020, which is a continuation of U.S. application Ser. No. 16/165,650, filed Oct. 19, 2018, which is a continuation of U.S. application Ser. No. 15/066,751, filed Mar. 10, 2016, now U.S. Pat. No. 10,118,141, which is a continuation of U.S. application Ser. No. 13/849,361, filed Mar. 22, 2013, now U.S. Pat. No. 9,700,857, which claims the benefit of U.S. Provisional Application No. 61/614,682, filed Mar. 23, 2012, which are incorporated herein by specific reference.

BACKGROUND OF THE INVENTION

1. The Field of the Invention

The present invention relates to fluid mixing systems and, more specifically, to fluid mixing systems having a rotatable elongated member that extends between opposing ends of a container and has one or more impellers disposed thereon.

2. The Relevant Technology

The biopharmaceutical industry uses a broad range of mixing systems for a variety of processes such as in the preparation of media and buffers and in the growing, mixing and suspension of cells and microorganisms. Some conventional mixing systems, including bioreactors and fermentors, comprise a flexible bag disposed within a rigid support housing. An impeller is disposed within the flexible bag and is coupled with the drive shaft. Rotation of the drive shaft and impeller facilitates mixing and/or suspension of the fluid contained within flexible bag.

To achieve optimal mixing/suspension, the impeller is typically located near the bottom of the bag. This positioning of the impeller typically necessitates the use of a relatively long drive shaft. As the volume of the bag increases, the length of a drive shaft and/or the speed of rotation of the drive shaft and impeller also typically increase. By increasing the length of the drive shaft and the speed of rotation of the drive shaft and impeller, there is a greater chance that the impeller/drive shaft will laterally walk or be displaced within the bag. Unwanted lateral movement of the impeller can potentially cause a number of problems. For example, lateral movement of the impeller can decrease optimal mixing and/or suspension of the fluid which can damage delicate cells and microorganisms. The lateral movement can also potentially cause the impeller/drive shaft to strike the side of the flexible bag which can rupture the bag and/or damage the impeller. Where the mixing system is part of a bioreactor or fermentor or where the solution otherwise needs to remain sterile, rupturing the bag would result in a complete loss of the product being processed. In addition, lateral movement of the impeller/drive shaft can place unwanted stresses on the mixing system which can cause failure.

Accordingly, what is needed in the art are mixing systems as discussed above wherein lateral movement of the impeller/drive shaft can be controlled.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

As used in the specification and appended claims, directional terms, such as "top," "bottom," "left," "right," "up," "down," "upper," "lower," "proximal," "distal" and the like are used herein solely to indicate relative directions and are not otherwise intended to limit the scope of the invention or claims.

The present invention relates to systems and methods for mixing fluids such as solutions or suspensions. The systems can be commonly used as bioreactors or fermentors for culturing cells or microorganisms. By way of example and not by limitation, the inventive systems can be used in culturing bacteria, fungi, algae, plant cells, animal cells, protozoan, nematodes, and the like. The systems can accommodate cells and microorganisms that are aerobic or anaerobic and are adherent or non-adherent. The systems can also be used in association with the formation and/or treatment of solutions and/or suspensions that are for biological purposes, such as media, buffers, or reagents. For example, the systems can be used in the formation of media where sparging is used to control the pH of the media through adjustment of the carbonate/bicarbonate levels with controlled gaseous levels of carbon dioxide. The systems can also be used for mixing powders or other components into a liquid where sparging is not required and/or where the solution/suspension is not for biological purposes.

Figure 1:
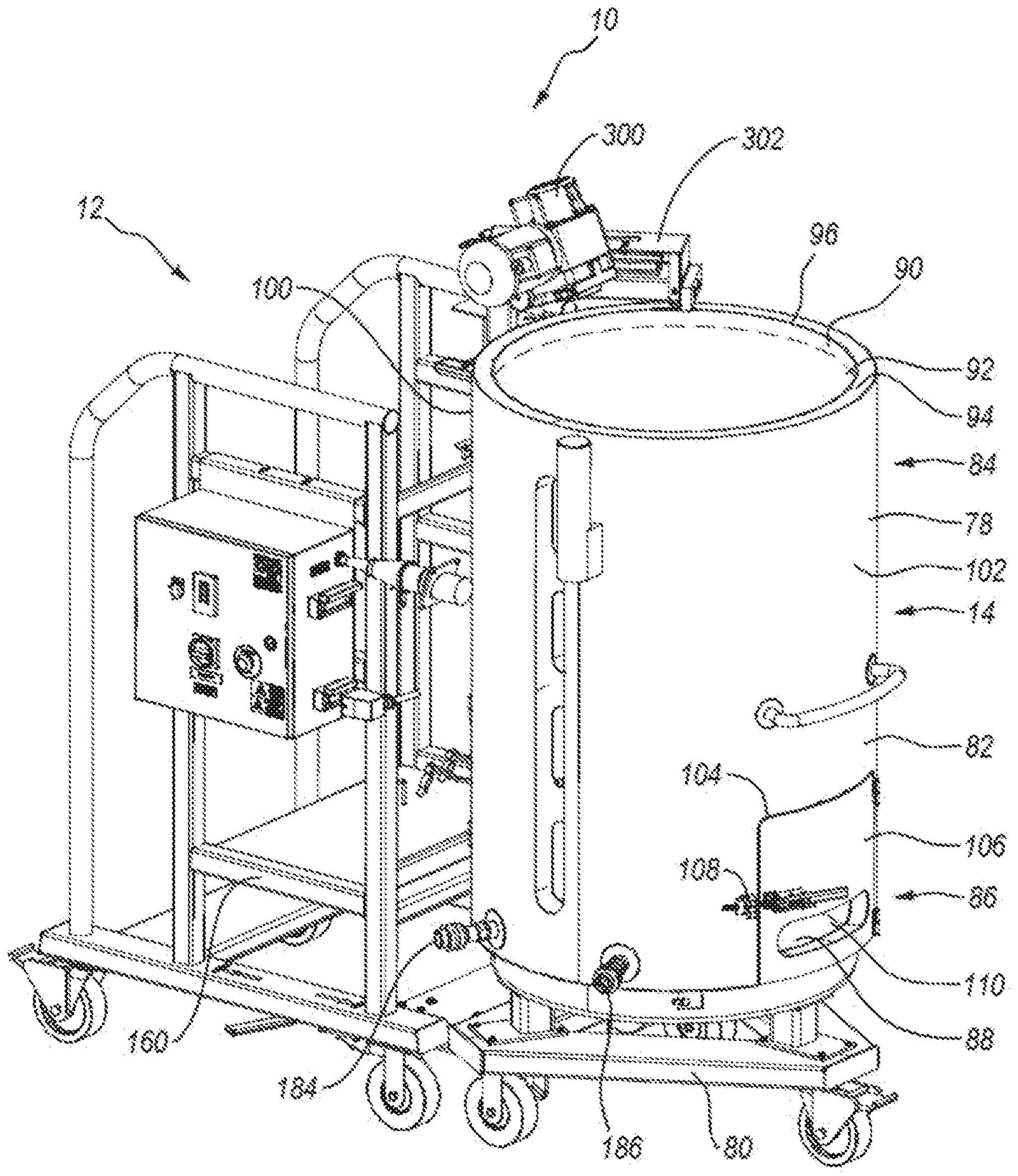
FIG. 1 is a perspective view of a portion of a fluid mixing system including a docking station coupled with a container station.
Figure 2:
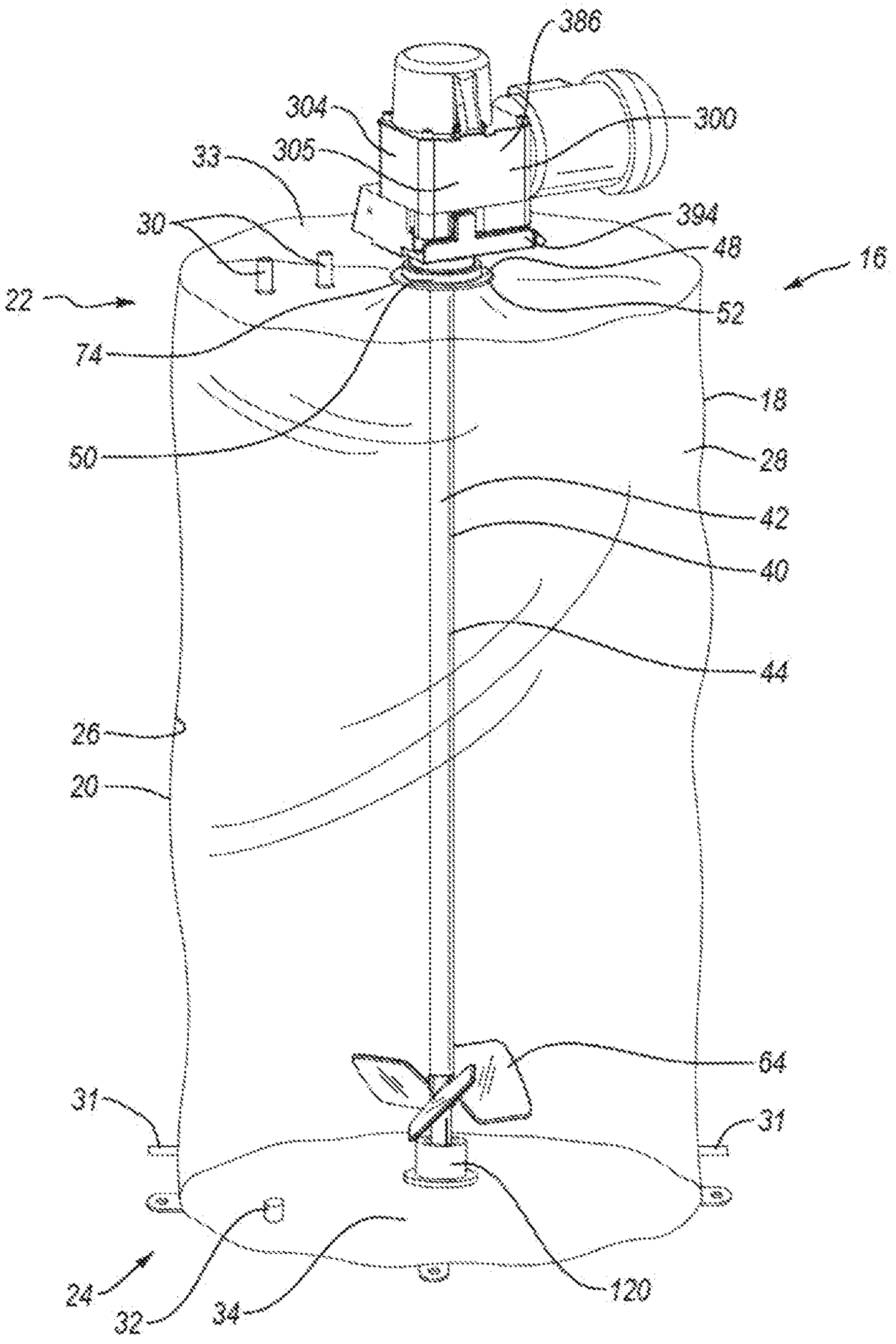
FIG. 2 is a perspective view of a container assembly that is used with the container station in FIG. 1.
Figure 5:
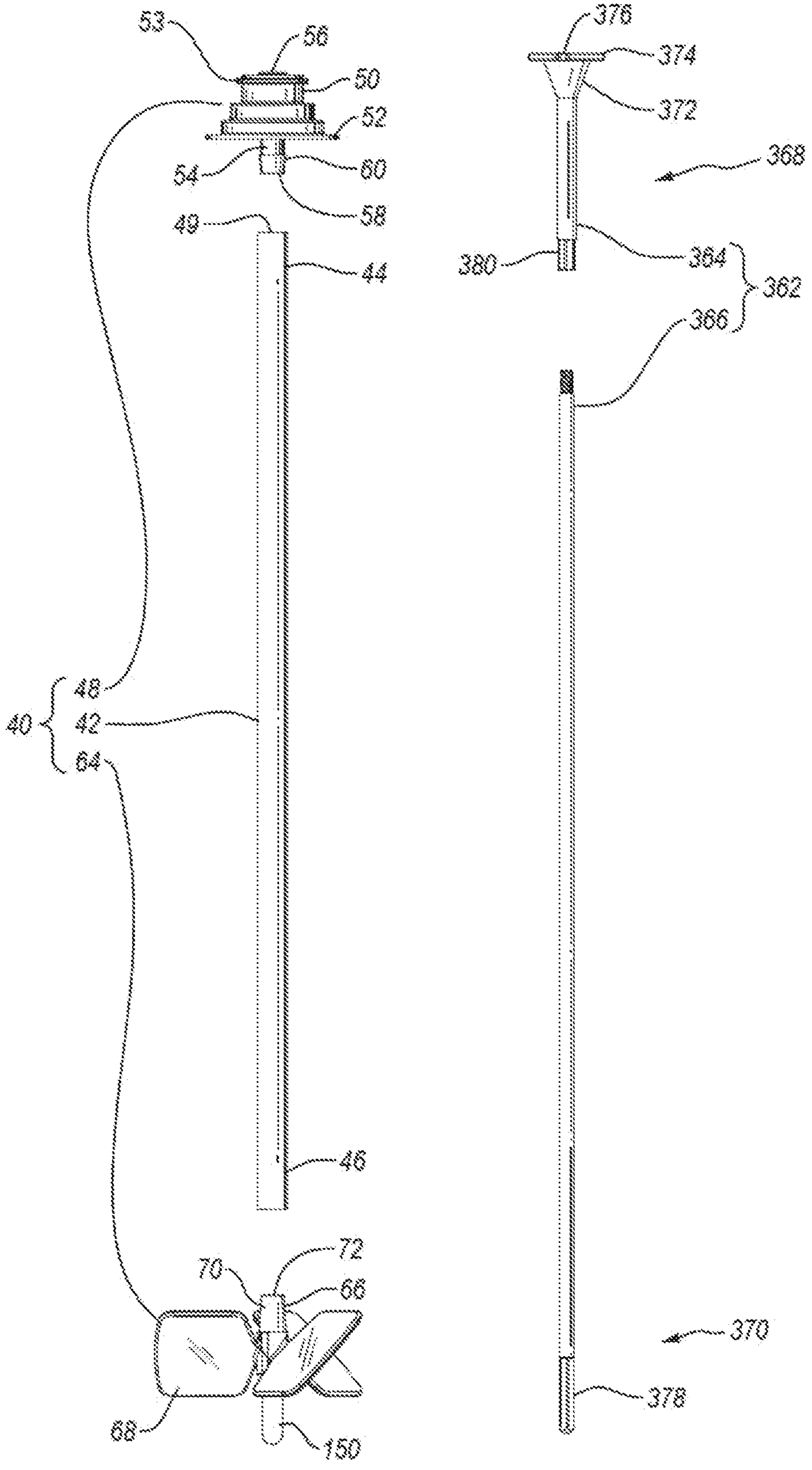
FIG. 5 is an exploded view of the impeller assembly shown in FIG. 2 and a drive shaft that is used therewith.

Depicted in FIGS. 1, 2, and 5 is one embodiment of an inventive mixing system 10 incorporating features of the present invention. In general, mixing system 10 comprises a docking station 12, a container station 14 that removably docks with docking station 12, a container assembly 16 (FIG. 2) that is supported by container station 14, and a drive shaft 362 (FIG. 5) that extends between docking station 12 and container assembly 16. Container assembly 16 houses the fluid that is mixed. The various components of mixing system 10 will now be discussed in greater detail.

As depicted in FIG. 2, container assembly 16 comprises a container 18 having a side 20 that extends from an upper end 22 to an opposing lower end 24. Upper end 22 terminates at an upper end wall 33 while lower end 24 terminates at a lower end wall 34. Container 18 also has an interior surface 26 that bounds a compartment 28. Compartment 28 is configured to hold a fluid. In the embodiment depicted, container 18 comprises a flexible bag that is comprised of a flexible, water impermeable material such as a low-density polyethylene or other polymeric sheets having a thickness in a range between about 0.1 mm to about 5 mm with about 0.2 mm to about 2 mm being more common. Other thicknesses can also be used. The material can be comprised of a single ply material or can comprise two or more layers which are either sealed together or separated to form a double wall container. Where the layers are sealed together, the material can comprise a laminated or extruded material. The laminated material comprises two or more separately formed layers that are subsequently secured together by an adhesive. Examples of extruded material that can be used in the present invention include the Thermo Scientific CX3-9 and Thermo Scientific CX5-14 films available from Thermo Fisher Scientific. The material can be approved for direct contact with living cells and be capable of maintaining a solution sterile. In such an embodiment, the material can also be sterilizable such as by ionizing radiation.

In one embodiment, container 18 can comprise a two-dimensional pillow style bag. In another embodiment, container 18 can be formed from a continuous tubular extrusion of polymeric material that is cut to length. The ends can be seamed closed or panels can be sealed over the open ends to form a three-dimensional bag. Three-dimensional bags not only have an annular side wall but also a two dimensional top end wall and a two dimensional bottom end wall. Three dimensional containers can comprise a plurality of discrete panels, typically three or more, and more commonly four or six. Each panel is substantially identical and comprises a portion of the side wall, top end wall, and bottom end wall of the container. Corresponding perimeter edges of each panel are seamed together. The seams are typically formed using methods known in the art such as heat energies, RF energies, sonics, or other sealing energies.

In alternative embodiments, the panels can be formed in a variety of different patterns. Further disclosure with regard to one method of manufacturing three-dimensional bags is disclosed in United States Patent Publication No. US 2002-0131654 A1, published Sep. 19, 2002 which is incorporated herein by specific reference in its entirety.

It is appreciated that container 18 can be manufactured to have virtually any desired size, shape, and configuration. For example, container 18 can be formed having a compartment sized to 10 liters, 30 liters, 100 liters, 250 liters, 500 liters, 750 liters, 1,000 liters, 1,500 liters, 3,000 liters, 5,000 liters, 10,000 liters or other desired volumes. The size of the compartment can also be in the range between any two of the above volumes. Although container 18 can be any shape, in one embodiment container 18 is specifically configured to be generally complementary to the chamber on container station 14 in which container 18 is received so that container 18 is properly supported within the chamber.

Although in the above discussed embodiment container 18 is in the configuration of a flexible bag, in alternative embodiments it is appreciated that container 18 can comprise any form of collapsible container or semi-rigid container. Container 18 can also be transparent or opaque.

Continuing with FIG. 2, formed on container 18 are a plurality of ports 30 at upper end 22, a plurality of ports 31 on opposing sides of side 20 at lower end 24, and a port 32 on lower end wall 34. Each of ports 30-32 communicate with compartment 28. Although only a few ports 30-32 are shown, it is appreciated that container 18 can be formed with any desired number of ports 30-32 and that ports 30-32 can be formed at any desired location on container 18. Ports 30-32 can be the same configuration or different configurations and can be used for a variety of different purposes. For example, ports 30-32 can be coupled with fluid lines for delivering media, cell cultures, and/or other components into container 18 and withdrawing fluid from container 18. Ports 30-32 can also be used for delivering gas to container 18, such as through a sparger, and withdrawing gas from container 18.

Ports 30-32 can also be used for coupling probes and/or sensors to container 18. For example, when container 18 is used as a bioreactor or fermentor for growing cells or microorganisms, ports 30-32 can be used for coupling probes such as temperatures probes, pH probes, dissolved oxygen probes, and the like. Various optical sensors and other types of sensors can also be attached to ports 30-32. Examples of ports 30-32 and how various probes, sensors, and lines can be coupled thereto is disclosed in United States Patent Publication No. 2006-0270036, published Nov. 30, 2006 and United States Patent Publication No. 2006-0240546, published Oct. 26, 2006, which are incorporated herein in their entirety by specific reference. Ports 30-32 can also be used for coupling container 18 to secondary containers, to condenser systems, and to other desired fittings.

Figure 3:
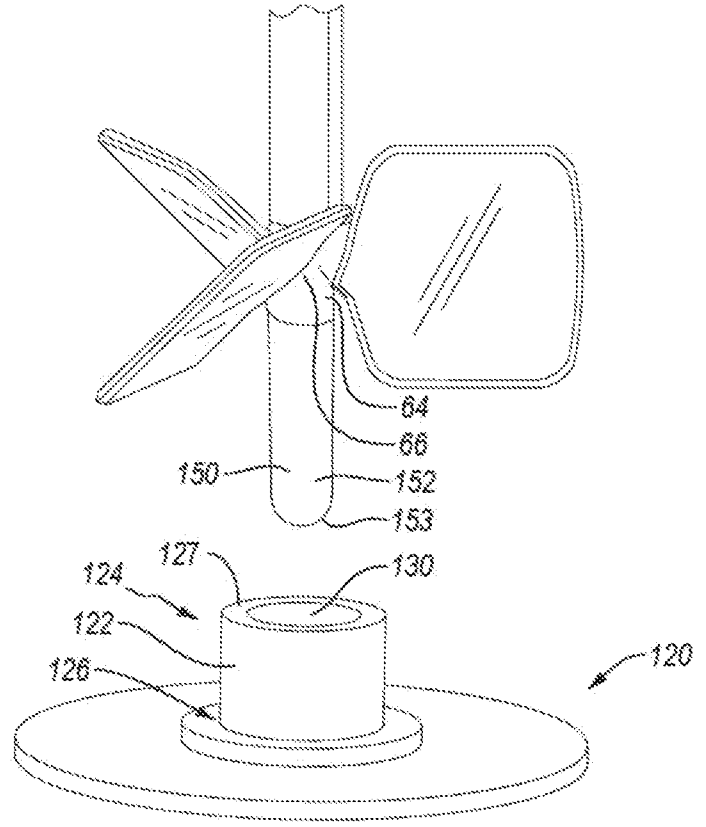
FIG. 3 is a perspective view of the impeller and retainer of the container assembly shown in FIG. 2.
Figure 4:
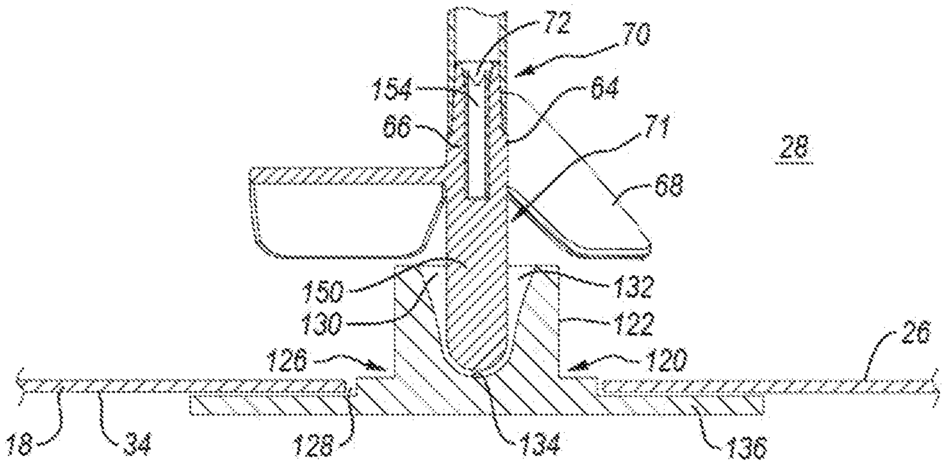
FIG. 4 is a cross sectional side view of the steady support of the impeller received within the retainer shown in FIG. 3.

Centrally mounted on lower end wall 34 of container 18 is a retainer 120. As depicted in FIGS. 3 and 4, retainer 120 comprises a post 122 having an upper end 124 and an opposing lower end 126. Upper end 124 terminates at an upper end face 127 having a retention cavity 130 formed thereon. Although retention cavity 130 can have a variety of different configurations, in the embodiment depicted cavity 130 has a circular upper end 132 the radially inwardly tapers and then terminates at a rounded floor 134. In an alternative embodiment, cavity 130 can have a cylindrical configuration with a flat floor. Other configurations can also be used.

Radially outwardly projecting from lower end 126 of post 122 is an annular flange 136. Flange 136 is welded or otherwise secured to lower end wall 34 of container 18 so that post 122 projects into compartment 28 of container 18. For example, an opening 128 can centrally extend through lower end wall 34 of container 18. Post 122 can be advanced through opening 128 and then flange 136 welded to the exterior surface of container 18 encircling opening 128. As a result, cavity 130 is sealed within compartment 28 of container 18. In an alternative embodiment, opening 128 can be eliminated and flange 136 can be welded or otherwise secured to interior surface 26 of lower end wall 34 so that cavity 130 is sealed within compartment 28. Flange 136 can also be eliminated and the lower end surface of post 122 could be secured to interior surface 26.

As shown in FIG. 2, container assembly 16 further comprises an impeller assembly 40. As depicted in FIG. 5, impeller assembly 40 comprises an elongated tubular connector 42 having a rotational assembly 48 mounted at one end and an impeller 64 mounted on the opposing end. More specifically, tubular connector 42 has a first end 44 and an opposing second end 46 with a passage 49 that extends therebetween. In one embodiment, tubular connector 42 comprises a flexible tube such as a polymeric tube. This enables connector 42 to be coiled, bent, or folded during sterilization, transport, and/or storage so as to minimize space. In other embodiments, tubular connector 42 can comprise a rigid tube or other tubular structure.

Figure 10:
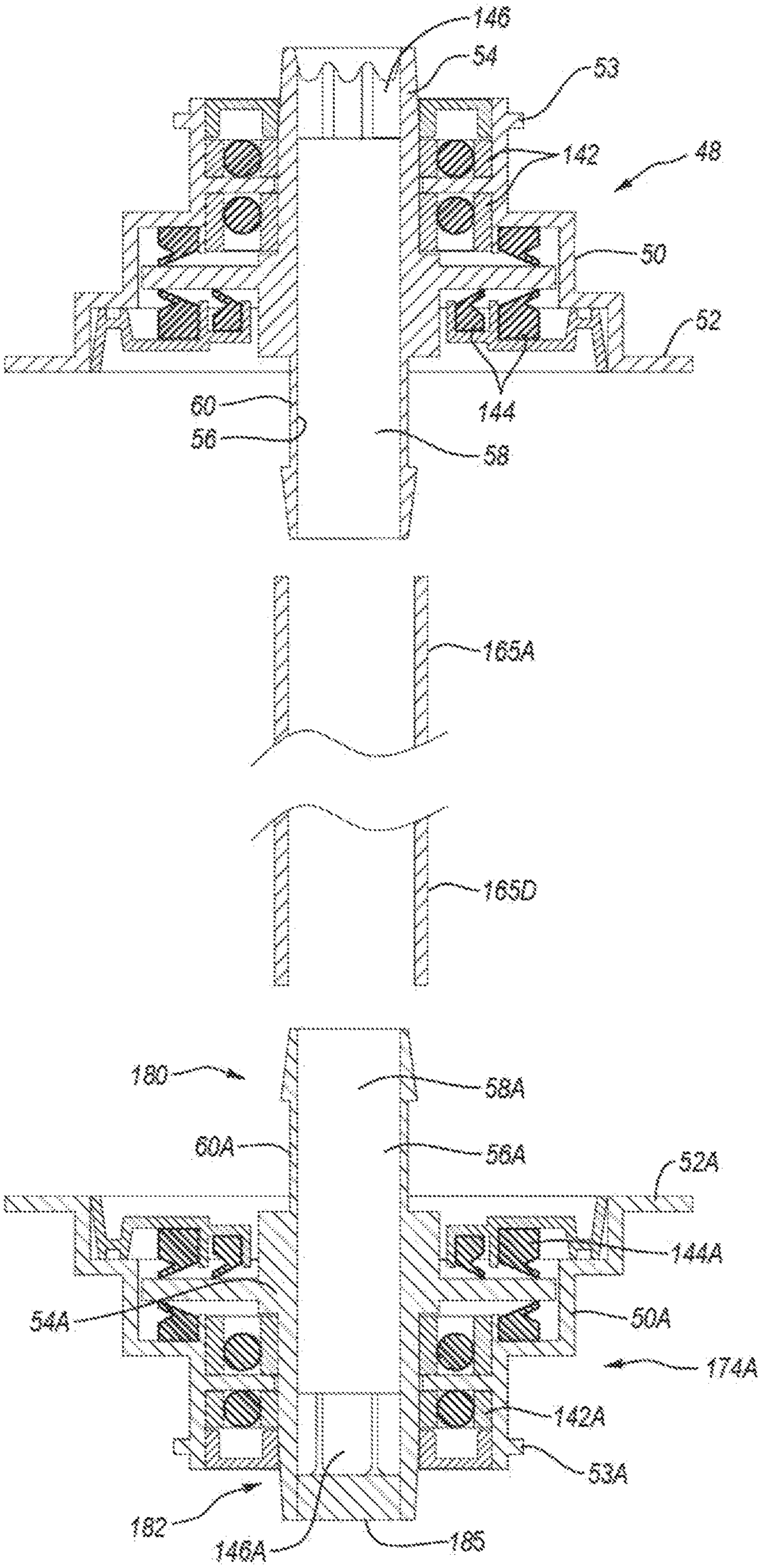
FIG. 10 is a cross sectional side view of a portion of the impeller assembly shown in FIG. 9.

Rotational assembly 48 is mounted to first end 44 of tubular connector 42. As depicted in FIG. 10, rotational assembly 48 comprises an outer casing 50 having an outwardly projecting annular sealing flange 52 and an outwardly projecting mounting flange 53. A tubular hub 54 is rotatably disposed within outer casing 50. One or more bearing assemblies 142 can be disposed between outer casing 50 and hub 54 to permit free and easy rotation of hub 54 relative to casing 50. Likewise, one or more seals 144 can be formed between outer casing 50 and hub 54 so that during use an aseptic seal can be maintained between outer casing 50 and hub 54.

Hub 54 has an interior surface 56 that bounds an opening 58 extending therethrough. As will be discussed below in greater detail, interior surface 56 includes an engaging portion 146 having a polygonal or other non-circular transverse cross section so that a driver portion 380 of drive shaft 362 (FIG. 5) passing through opening 58 can engage engaging portion 146 and facilitate rotation of hub 54 by rotation of drive shaft 362. Hub 54 can also comprise a tubular stem 60 projecting away from outer casing 50. Returning to FIG. 5, hub 54 can couple with first end 44 of tubular connector 42 by stem 60 being received within first end 44. A pull tie, clamp, crimp or other fastener can then be used to further secure stem 60 to tubular connect 42 so that a liquid tight seal is formed therebetween. Other conventional connecting techniques can also be used.

Impeller 64 comprises a central hub 66 having a plurality of blades 68 radially outwardly projecting therefrom. In the embodiment depicted, blades 68 are integrally formed as a unitary structure with hub 66. In other embodiments, blades 68 can be separately attached to hub 66. It is appreciated that a variety of different numbers and configurations of blades 68 can be mounted on hub 66. Hub 66 has a first end 70 with a blind socket 72 formed thereat. Socket 72 typically has a noncircular transverse cross section, such as polygonal, so that it can engage a driver portion 378 of drive shaft 362. Accordingly, as will be discussed below in greater detail, when driver portion 378 is received within socket 72, driver portion 378 engages with impeller 64 such that rotation of drive shaft 362 facilitates rotation of impeller 64.

Turning to FIGS. 3 and 4, hub 66 of impeller 64 also has an opposing second end 71. Projecting from second end 71 in longitudinal alignment with socket 72 is an elongated steady support 150. Steady support 150 is depicted as having a cylindrical body 152 that terminates at a rounded nose 153. In alternative embodiments, body 152 can inwardly taper toward nose 153 and need not have a circular transverse cross section. For example, body 152 can have a polygonal or other transverse cross sectional configuration. Steady support 150 is configured so that nose 153 can be received within retention cavity 130 of retainer 120 so that steady support 150 can freely rotate therein. Retainer 120 retains steady support 150 within retention cavity 130 so as to prevent unwanted lateral movement of impeller 64.

In one embodiment, hub 66, blades 68 and steady support 150 of impeller 64 are molded from a polymeric material. In alternative embodiments, impeller 64 can be made of metal, composite, or a variety of other materials. If desired, a tubular insert 154 can be positioned within socket 72 to help reinforce hub 66. For example, insert 154 can be comprised of metal or other material having a strength property greater than the material from which hub 66 is comprised.

Returning to FIG. 5, impeller 64 can be attached to connector 42 by inserting first end 70 of hub 66 within connector 42 at second end 46. A pull tie, clamp, crimp, or other type of fastener can then be cinched around second end 46 of connector 42 so as to form a liquid tight sealed engagement between impeller 64 and connector 42.

Turning to FIG. 2, rotational assembly 48 is secured to container 18 so that tubular connector 42 and impeller 64 extend into or are disposed within compartment 28 of container 18. Specifically, in the depicted embodiment container 18 has an opening 74 at upper end 22. Sealing flange 52 of outer casing 50 is sealed around the perimeter edge bounding opening 74 so that hub 54 (FIG. 5) is aligned with opening 74. Tubular connector 42 having impeller 64 mounted on the end thereof projects from hub 54 into compartment 28 of container 18. In this configuration, outer casing 50 is fixed to container 18 but hub 54, and thus also tubular connector 42 and impeller 64, can freely rotate relative to outer casing 50 and container 18. As a result of rotational assembly 48 sealing opening 74, compartment 28 is sealed closed so that it can be used in processing sterile fluids.

As depicted in FIG. 5, impeller assembly 40 is used in conjunction with drive shaft 362. In general drive shaft 362 comprises a head section 364 and a shaft section 366 that can be coupled together by threaded connection or other techniques. Alternatively, drive shaft 362 can be formed as a single piece member or from a plurality of attachable sections. Drive shaft 362 has a first end 368 and an opposing second end 370. Formed at first end 368 is a frustoconical engaging portion 372 that terminates at a circular plate 374. Notches 376 are formed on the perimeter edge of circular plate 374 and are used for engaging drive shaft 362 with a drive motor assembly as will be discussed below.

Formed at second end 370 of drive shaft 362 is driver portion 378. Driver portion 378 has a non-circular transverse cross section so that it can facilitate locking engagement within hub 66 of impeller 64. In the embodiment depicted, driver portion 378 has a polygonal transverse cross section. However, other non-circular shapes can also be used. Driver portion 380 is also formed along drive shaft 362 toward first end 368. Driver portion 380 also has a non-circular transverse cross section and is positioned so that it can facilitate locking engagement within engaging portion 146 (FIG. 10) of rotational assembly 48.

During use, as will be discussed below in further detail, drive shaft 362 is advanced down through hub 54 of rotational assembly 48, through tubular connecter 42 and into hub 66 of impeller 64. As a result of the interlocking engagement of driver portions 378 and 380 with hubs 66 and 54, respectively, rotation of drive shaft 362 by a drive motor assembly facilitates rotation of hub 54, tubular connecter 42 and impeller 64 relative to outer casing 50 of rotational assembly 48. As a result of the rotation of impeller 64, fluid within container 18 is mixed.

It is appreciated that impeller assembly 40, drive shaft 362 and the discrete components thereof can have a variety of different configurations and can be made of a variety of different materials. Alternative embodiments of and further disclosure with respect to impeller assembly 40, drive shaft 362, and the components thereof are disclosed in U.S. Pat. No. 7,384,783, issued Jun. 10, 2008 and US Patent Publication No. 2011/0188928, published Aug. 4, 2011 which are incorporated herein in their entirety by specific reference.

Returning to FIG. 1, container station 14 comprises a support housing 78 supported on a cart 80. Support housing 78 has a substantially cylindrical sidewall 82 that extends between an upper end 84 and an opposing lower end 86. Lower end 86 has a floor 88 mounted thereto. As a result, support housing 78 has an interior surface 90 that bounds a chamber 92. An annular lip 94 is formed at upper end 84 and bounds an opening 96 to chamber 92. As discussed above, chamber 92 is configured to receive container assembly 16 so that container 18 is supported therein.

Although support housing 78 is shown as having a substantially cylindrical configuration, in alternative embodiments support housing 78 can have any desired shape capable of at least partially bounding a compartment. For example, sidewall 82 need not be cylindrical but can have a variety of other transverse, cross sectional configurations such as polygonal, elliptical, or irregular. Furthermore, it is appreciated that support housing 78 can be scaled to any desired size. For example, it is envisioned that support housing 78 can be sized so that chamber 92 can hold a volume of less than 50 liters, more than 1,000 liters or any of the other volumes or range of volumes as discussed above with regard to container 18. Support housing 78 is typically made of metal, such as stainless steel, but can also be made of other materials capable of withstanding the applied loads of the present invention.

With continued reference to FIG. 1, sidewall 82 of support housing 78 has a first side face 100 and an opposing second side face 102. An enlarged access 104 is formed on second side face 102 at lower end 86 so as to extend through sidewall 82. A door 106 is hingedly mounted to sidewall 82 and can selectively pivot to open and close access 104. A latch assembly 108 is used to lock door 106 in the closed position. An opening 110, which is depicted in the form of an elongated slot, extends through door 106. Opening 110 is configured to align with ports 31 (FIG. 2) of container assembly 16 when container assembly 16 is received within chamber 92. As a result, ports 32 project into or can otherwise be accessed through opening 110. In some embodiments, a line for carrying fluid or gas will be coupled with ports 31 and can extend out of chamber 92 through opening 110. As previously mentioned, any number of ports 30-32 can be formed on container 18 and thus any number of separated lines may pass out through opening 110 or through other openings formed on support housing 78 including through floor 88. Alternatively, different types of probes, inserts, spargers, connectors or the like may be coupled with ports 30-32 which can be accessed through opening 110 or other openings.

In one embodiment of the present invention means are provided for regulating the temperature of the fluid that is contained within container 18 when container 18 is disposed within support housing 78. By way of example and not by limitation, sidewall 82 can be jacketed so as to bound one or more fluid channels that encircle sidewall 82 and that communicate with an inlet port 184 and an outlet port 186. A fluid, such as water or propylene glycol, can be pumped into the fluid channel through inlet port 184. The fluid then flows in a pattern around sidewall 82 and then exits out through outlet port 186.

By heating or otherwise controlling the temperature of the fluid that is passed into the fluid channel, the temperature of support housing 78 can be regulated which in turn regulates the temperature of the fluid within container 18 when container 18 is disposed within support housing 78. In an alternative embodiment, electrical heating elements can be mounted on or within support housing 78. The heat from the heating elements is transferred either directly or indirectly to container 18. Alternatively, other conventional means can also be used such as by applying gas burners to support housing 78 or pumping the fluid out of container 18, heating the fluid and then pumping the fluid back into container 18. When using container 18 as part of a bioreactor or fermentor, the means for heating can be used to heat the culture within container 18 to a temperature in a range between about 30° C. to about 40° C. Other temperatures can also be used.

Figure 6:
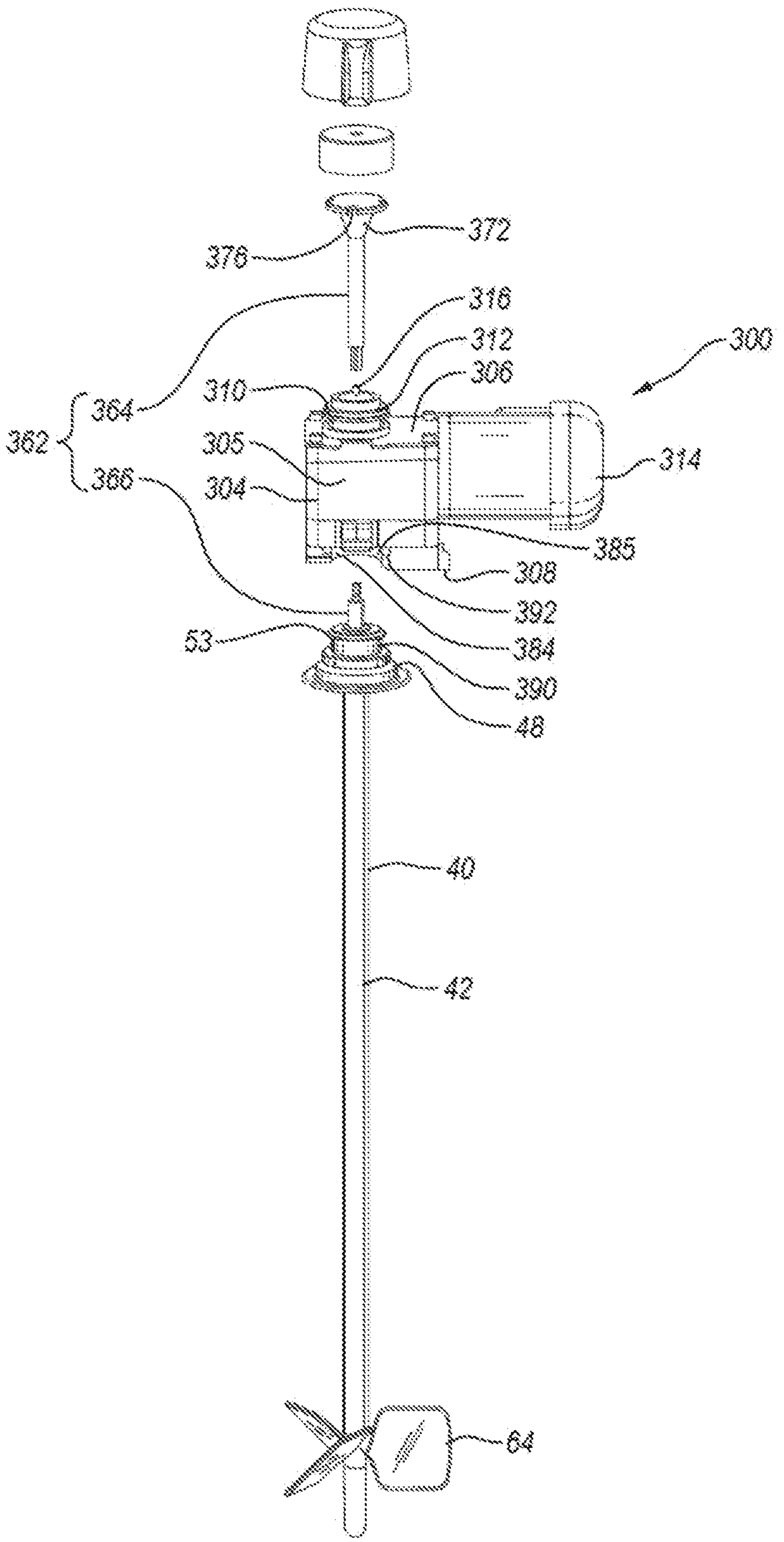
FIG. 6 is a partially exploded view of the impeller assembly and drive motor assembly shown in FIG. 2.

As depicted in FIG. 1, docking station 12 comprises a stand 160, an adjustable arm assembly 302 coupled to stand 160 and a drive motor assembly 300 mounted on arm assembly 302. Drive motor assembly 300 is used in conjunction with drive shaft 362 (FIG. 5) and can be used for mixing and/or suspending a culture, solution, suspension, or other liquid within container 18 (FIG. 2). Turning to FIG. 6, drive motor assembly 300 comprises a housing 304 having a front face 305 that extends from a top surface 306 to an opposing bottom surface 308. An opening 310 extends through housing 304 from top surface 306 to bottom surface 308. A tubular motor mount 312 is rotatably secured within opening 310 of housing 304. Upstanding from motor mount 312 is a locking pin 316. A drive motor 314 is mounted to housing 304 and engages with motor mount 312 so as to facilitate select rotation of motor mount 312 relative to housing 304. Drive shaft 362 is configured to pass through motor mount 312 so that engaging portion 372 of drive shaft 362 is retained within motor mount 312 and locking pin 316 of motor mount 312 is received within notch 376 of drive shaft 362. As a result, rotation of motor mount 312 by drive motor 314 facilitates rotation of drive shaft 362. Further discussion of drive motor assembly 300 and how it engages with drive shaft 362 and alternative designs of drive motor assembly 300 are discussed in US Patent Publication No. 2011/0188928 which was previously incorporated herein by specific reference.

Figure 7:
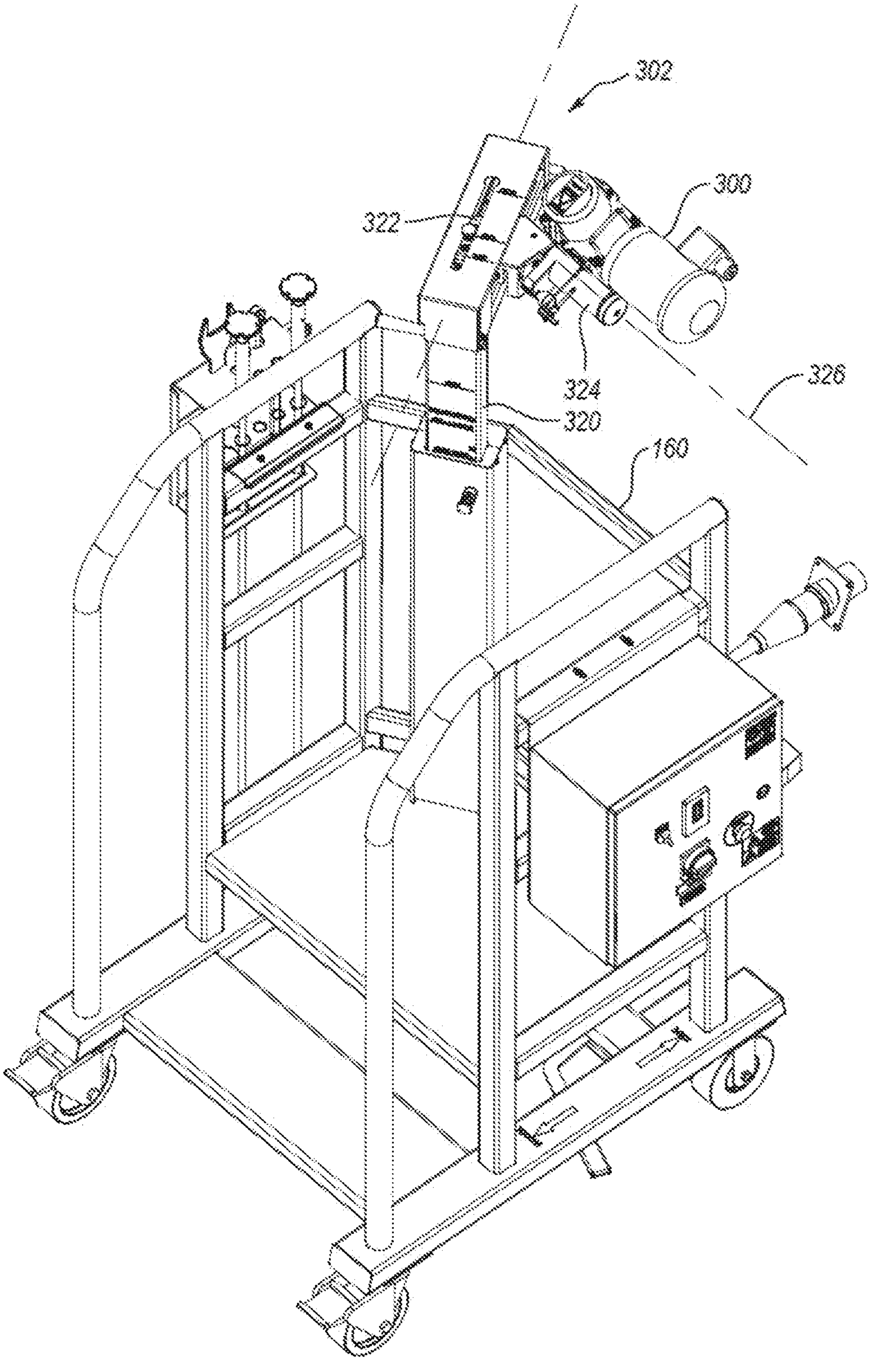
FIG. 7 is a back perspective view of the docking station shown in FIG. 1.

Arm assembly 302 is used to adjust the position of drive motor assembly 300 and thereby also adjust the position of drive shaft 362. As depicted in FIG. 7, arm assembly 302 comprises a first arm 320 mounted to stand 160 that vertically raises and lowers, a second arm 322 mounted to the first arm 320 that slides horizontally back and forth, and a third arm 324 mounted to second arm 322 that rotates about a horizontal axis 326. Drive motor assembly 300 is mounted to third arm 324. Accordingly, by movements of arms 320, 322, and 324, drive motor assembly 300 can be positioned in any desired location or orientation relative to support housing 78 and container assembly 16. Further discussion and alternative embodiments with regard to docking station 12, arm assembly 302, and container station 14 is provided in US Patent Publication No. 2011/0310696, published Dec. 22, 2011, which is incorporated herein in its entirety by specific reference.

During use, container station 14 and docking station 12 are securely coupled together, as shown in FIG. 1, and container assembly 16 (FIG. 2) is positioned within chamber

92 of support housing 78. One method of how docking station 12 and container assembly 16 can be coupled together is disclosed in US Patent Publication No. 2011/0310696 which was previously incorporated by reference. In this secure position, arm assembly 302 is used to properly position drive motor assembly 300 so that rotational assembly 48 (FIG. 2) can be coupled with drive motor assembly 300.

Specifically, as depicted in FIG. 6, housing 304 of drive motor assembly 300 has a U-shaped receiving slot 384 that is recessed on a front face 305 and bottom surface 308 so as to communicate with opening 310 extending through housing 304. Receiving slot 384 is bounded by an inside face 385 on which a U-shaped catch slot 392 is recessed. As shown in FIG. 2, a door 394 is hingedly mounted to housing 304 and selectively closes the opening to receiving slot 384 from front face 305. As depicted in FIG. 6, to facilitate attachment of rotational assembly 48 to housing 304, door 394 is rotated to an open position and rotational assembly 48 is horizontally slid into receiving slot 384 from front face 305 of housing 304 so that mounting flange 53 of rotational assembly 48 is received within catch slot 392. Rotational assembly 48 is advanced into receiving slot 384 so that opening 58 of rotational assembly 48 (FIG. 10) aligns with the passage extending through motor mount 312. In this position, door 394 is moved to the closed position and secured in place by a latch or other locking mechanism so that rotational assembly 48 is locked to drive motor assembly 300.

Once rotational assembly 48 is secured to drive motor assembly 300, drive shaft 362 can be advanced down through drive motor assembly 300 and into impeller assembly 40 so as to engage impeller 64. During the advancement of drive shaft 362, container 18 can be manipulated, such as through door 106 on support housing 78 (FIG. 1), or is otherwise properly positioned within support housing 78 so that steady support 150 of impeller 64 is received within retention cavity 130 of retainer 120 as shown in FIG. 4. Arm assembly 302 (FIG. 1) can also be adjusted to help properly position and orientate drive shaft 362 and steady support 150. For example, by adjusting arm assembly 302, drive shaft 362 can be adjusted so as to be centered and vertically oriented within container 18 and support housing 78 or drive shaft 362 can be oriented at an angle, such as in a range between 10° to 30° from vertical. Other orientations can also be used. Furthermore, arm assembly 302 can be used to position steady support 150 of impeller 64 into retention cavity 130 and/or adjust the location of steady support 150 within retention cavity 130 so as to minimize friction therebetween.

Either before or after inserting drive shaft 362 into impeller assembly 40, container 18 can be at least partially filled with fluid. The fluid helps to stabilize retainer 120 on floor 88 of support housing 78 to help facilitate alignment with steady support 150.

Once drive shaft 362 is properly positioned, container 18 can be filed with media or other processing fluids. Where container 18 is functioning as a bioreactor or fermentor, cells or microorganisms along with nutrients and other standard components can be added to container. Before or after adding the different components, drive motor assembly 300 can activated causing drive shaft 362 to rotate impeller 64 and thereby mix or suspend the fluid within container 18. As a result of the engagement between steady support 150 and retainer 120, drive shaft 362 and impeller 64 can be rotated at high speeds without concern for lateral displacement of drive shaft 362 or impeller 64.

In mixing system 10, docking station 12 is used which includes arm assembly 302. In this design, docking station 12 can be coupled with any number of different container stations 14 having a container assembly 16 therein. In an alternative embodiment, however, docking station 12 can be eliminated and arm assembly 302 can be mounted directly onto support housing 78. Alternative examples of arm assemblies and how they can be mounted onto support housing 78 is disclosed in U.S. patent application Ser. No. 13/659,616, filed Oct. 24, 2012, published as US2013/0101982 on Apr. 25, 2013 which is incorporate herein in its entirety by specific reference.

Figure 8:
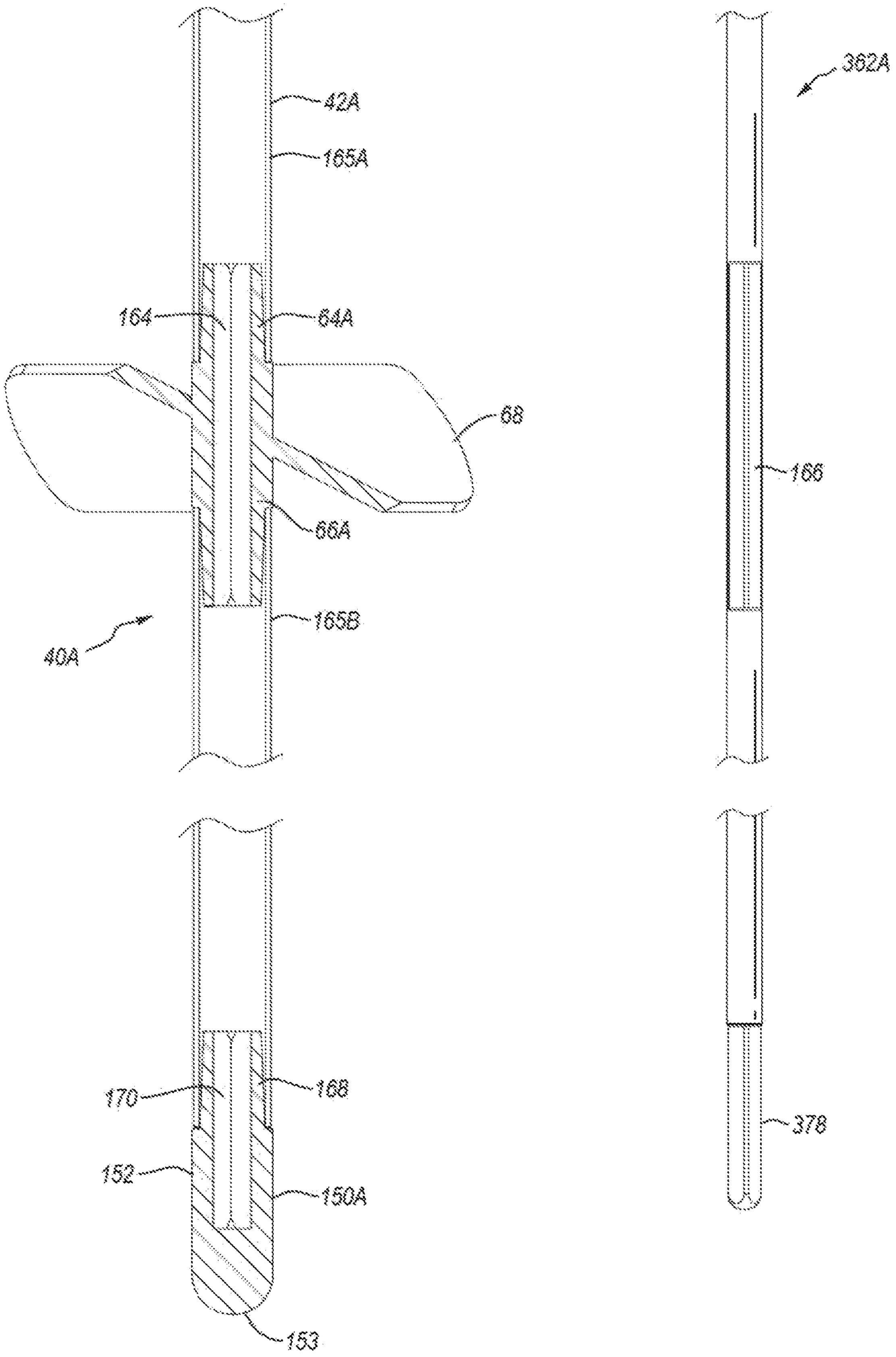
FIG. 8 is a cross sectional side view of the lower end of an alternative embodiment of an impeller assembly and corresponding drive shaft.

The above described mixing system 10 is one embodiment of how to prevent unwanted lateral movement of drive shaft 362 and impeller 64. It is appreciated, however, that there are a variety of other ways in which the drive shaft and impeller can be retained. For example, depicted in FIG. 8 is an alternative embodiment of an impeller assembly 40A. Impeller assembly 40A includes a tubular connector 42A which is comprised of a plurality of separate tube sections, for example, tube sections 165A and 165B. Tube sections 165A and 165B are typically flexible but can also be rigid. Secured between ends of tube sections 165A and 165B is an impeller 64A. Impeller 64A has a central hub 66A having a passage 164 that extends entirely through the length of hub 66A. At least a portion of passage 164 has a non-circular engaging surface for interlocking with a corresponding driver portion 166 on drive shaft 362A. Blades 68 radially outwardly project from hub 66A.

Mounted at the opposing end of tube section 165B is a steady support 150A. Steady support 150A includes body 152 having rounded nose 153. However, in contrast to steady support 150 which forms part of impeller 64, steady support 150A has a tapered first end 168 that is coupled with the end of tube section 165B. A socket 170 is formed at first end 168 and has a non-circular engaging surface for engaging with driver portion 378 on drive shaft 362A.

Impeller assembly 40A includes rotational assembly 48 at its first end and is coupled to container 18 in the same manner as impeller assembly 40. Impeller assembly 40A also operates in the same manner and in the same cooperation with retainer 120 as impeller assembly 40, except that steady support 150A is now spaced apart from impeller 64A. It is appreciated that impeller assembly 40A can include any number of spaced apart impellers 64A, such as 1, 2, 3, 4, 5 or more, along tubular connector 44A. Tube sections 165 of tubular connector 44A can extend between each of impellers 64A.

Figure 9:
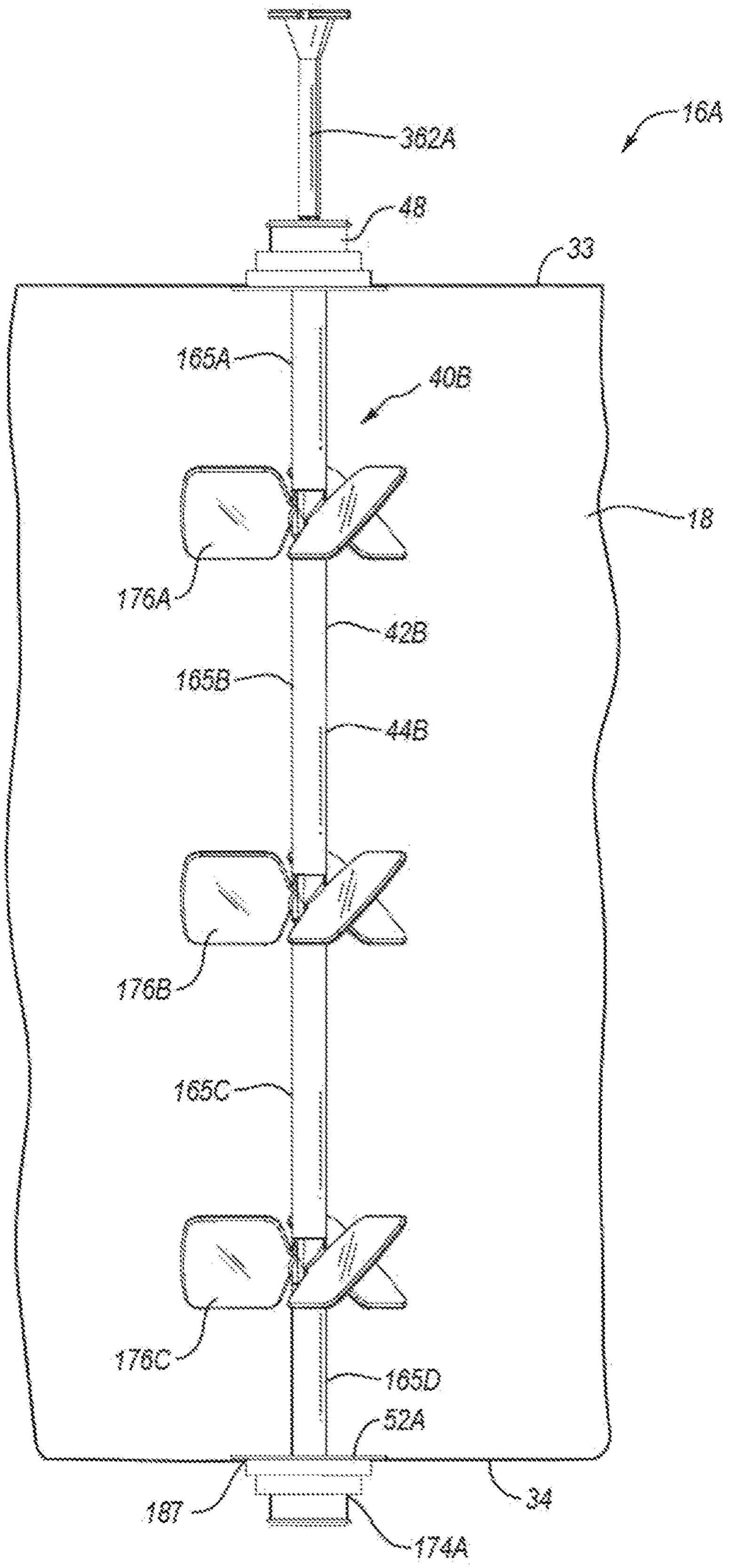
FIG. 9 is a side view of an alternative embodiment of a container assembly and corresponding drive shaft.

Depicted in FIG. 9 is another alternative embodiment of a container assembly 16A having an impeller assembly 40B. Impeller assembly 40B comprises rotational assembly 48 mounted to upper end wall 33 of container 18, a retainer 174A mounted to lower end wall 34, a plurality of spaced apart impellers 176A-C disposed within container 18, and a tubular connector 42B that comprises a plurality of tube sections 165A-D that connect to and extend between rotational assembly 48, retainer 174A and spaced apart impellers 176A-C. Impellers 176A-C can have the same configuration as impeller 64A as shown in FIG. 8. As such, impellers 176 and tube sections 165 combine to bound a passageway that extends from rotational assembly 48 to retainer 174A.

Turning to FIG. 10, in one embodiment retainer 174A can comprise a rotational assembly having substantially the same configuration as rotational assembly 48. Specifically, retainer 174A comprises an outer casing 50A having an outwardly projecting sealing flange 52A and a tubular hub 54A rotatably disposed within outer casing 50A. One or more bearing assemblies 142A can be disposed between outer casing 50A and tubular hub 54A to permit free and easy rotation of hub 54A relative to casing 50A. Likewise, one or more seals 144A can be formed between outer casing 50A and tubular hub 54A so that during use an aseptic seal can be maintained between outer casing 50A and tubular hub 54A as tubular hub 54A rotates relative to outer casing 50A.

Hub 54A has a first end 180 that connects with tube section 165D and has an opposing second end 182. Hub 54A has an interior surface 56A that bounds an opening 58A. In the present embodiment, opening 58A is a blind socket that is open at first end 180 but is closed by a floor 185 at second end 182. Interior surface 56A includes an engaging portion 146A having a polygonal or other non-circular transverse cross section so that driver portion 378 of drive shaft 362A (FIG. 8) can be received within opening 58A and engage engaging portion 146A. As a result, rotation of drive shaft 362A facilitates rotation of hub 54A. Hub 54A also comprises a tubular stem 60A projecting away from outer casing 50A. First end 180 of hub 54A can couple with tube section 165D by stem 60A being received within the end of tube section 165D. A pull tie, clamp, crimp or other fastener can then be used to further secure stem 60A to tube section 165D so that a liquid tight seal is formed therebetween. Other conventional connecting techniques can also be used.

During assembly, as depicted in FIG. 9, retainer 174A is received within a hole 187 formed on lower end wall 34 and sealing flange 52A is welded to the interior surface of container 18. Rotational assembly 48 is similarly secured to upper end wall 33, as previously discussed with regard to FIG. 2, so that the assembled tube sections 152A-D and impellers 176A-C extend between and provide an open passageway between rotational assembly 48 and retainer 174A. During operation, drive shaft 362A is passed down through the passageway so that corresponding driver portions on drive shaft 362A engage with the hubs of rotational assembly 48 and retainer 174A and each of impellers 176A-C. As a result, rotation of drive shaft 362A facilitates rotation of the hubs, tube sections, and impellers which in turn facilitate mixing or suspension of the fluid within container 18. This embodiment of the present invention again ensures that the drive shaft and impellers are held in position so as to prevent unwanted lateral movement even at extended lengths and high rotation speeds.

In alternative embodiments, it is appreciated that drive shaft 362A need not directly engage each of the hubs and impellers. For example, drive shaft 362A could engage hubs 54 and 54A but not impellers 176A-C. In this embodiment, rotation of hubs 54 and 54A would cause rotation of tube sections 165A and 165D which would then indirectly cause rotation of impellers 176A-C. Likewise, drive shaft 362A need not engage with hubs 54 and/or 54A. In this example, if drive shaft 362A engages with and rotates impellers 176A-C, this rotation causes rotation of tube sections 165A and 165D which then indirectly causes rotation of hubs 54 and 54A. As such, drive shaft 362A can be configured to engage any combination of hubs and impellers or other sections along tube sections 165. In another embodiment, tubular connector 42B can comprise one continuous tube that extends between rotational assembly 48 and retainer 174A. Any number of impellers can then be mounted along the exterior surface of tubular connector 42B.

Figure 11:
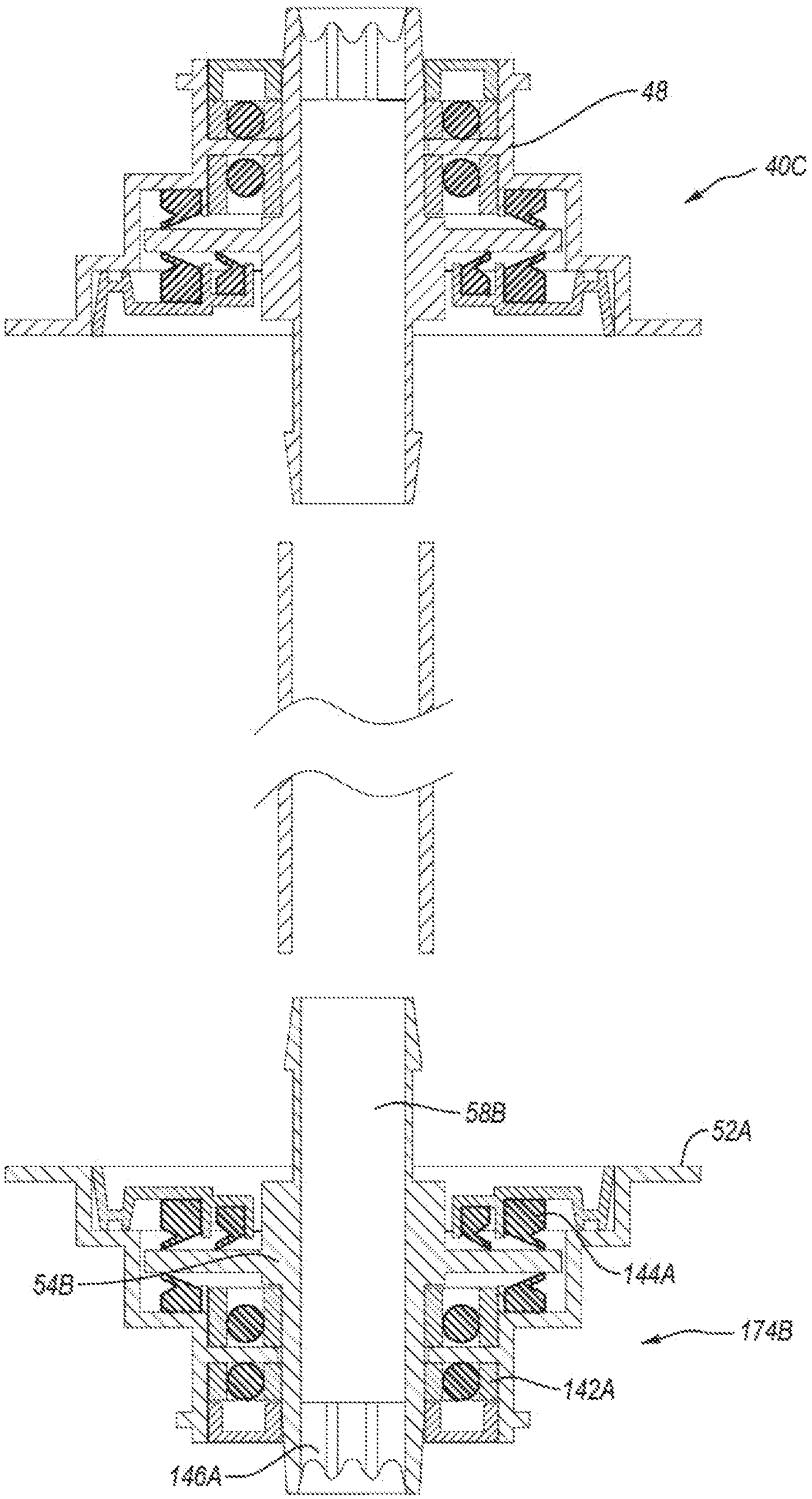
FIG. 11 is a cross sectional side view of a portion of an alternative embodiment of the impeller assembly shown in FIG. 10.
Figure 12:
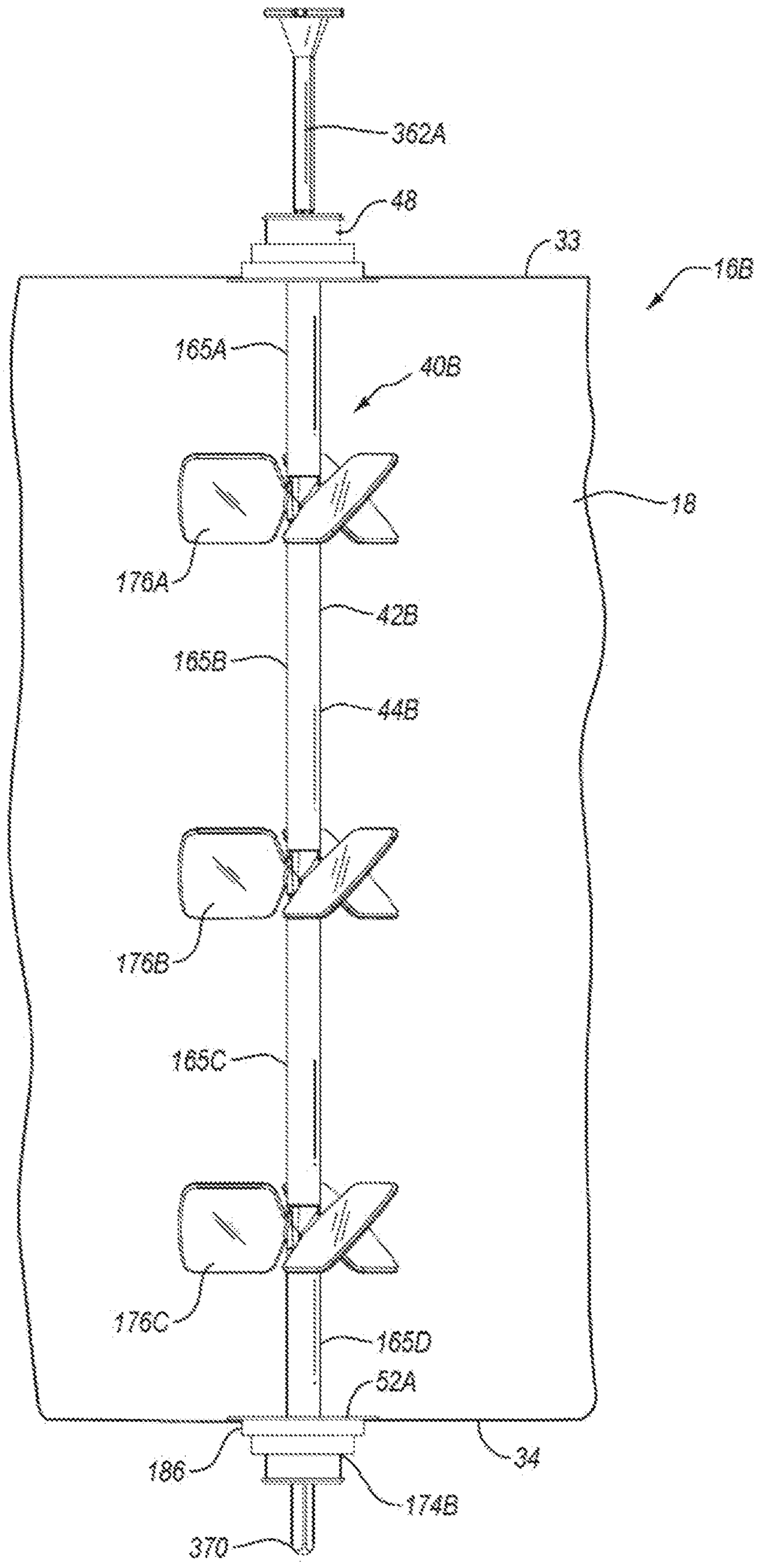
FIG. 12 is a side view of an alternative embodiment of a container assembly using the impeller assembly shown in FIG. 11.

Depicted in FIG. 11 is another alternative embodiment of an impeller assembly 40C that can be used with container 18. Impeller assembly 40C is substantially the same as impeller assembly 40B except that in contrast to using retainer 174A that has hub 54A with blind socket 58A, impeller assembly 40C includes a retainer 174B having a hub 54B with an opening 58B that extends all the way through hub 54B. In this embodiment, as depicted in FIG. 12, drive shaft 362A can be lengthened so that second end 370 extends all the way through retainer 172B and through floor 88 (FIG. 1) of support housing 78. If desired, a separate drive motor assembly can then be coupled with second end 370 so that drive shaft 362 can be driven from both ends. This can be helpful for systems where the drive shaft is very long and/or needs extra power to be rotated at high speeds or needs extra support.

With regard to previously discussed impeller assemblies 40B and 40C, it is envisioned that a cavity or hole may need to be formed in floor 88 (FIG. 1) of support housing 78 to receive the portion of retainers 174A and 174B that project outside of container 18. (See FIGS. 9 and 12). In an alternative embodiment, however, retainers 174A and 174B can be modified to mount flush with the interior or exterior surface of lower end wall 34 by modifying the retainers so that the seals and bearings are positioned within container 18.

Figure 13:
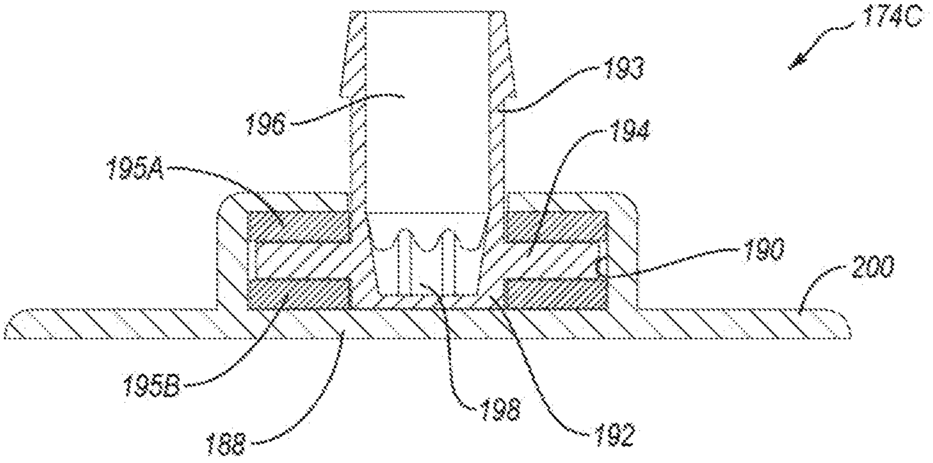
FIG. 13 is a cross sectional side view of a retainer that can replace the retainer shown in FIG. 9.

In yet another alternative embodiment, retainer 174A can be replaced by a retainer 174C as shown in FIG. 13. Retainer 174C comprises an outer casing 188 that bounds a cavity 190 in which a hub 192 is rotatably mounted. Hub 192 comprises a stem 193 having a flange 194 radially outwardly projecting therefrom within cavity 190. Stem 193 can be coupled with tube section 165D (FIG. 9). Bearings 195A and B, such as circular roller thrust bearings, can be positioned within cavity 190 on opposing sides of flange 194 to facilitate easy rotation of hub 192. Stem 193 has an opening 196 formed thereon having the configuration of a blind socket. At least a portion of the interior surface of stem 193 bounds a non-circular engaging surface 198 that will couple with driver portion 378 on drive shaft 362 (FIG. 8). Outer casing 188 has an annular flange 200 which can be secured to the interior surface of container 18. Alternatively, a hole can be formed on container 18 and flange 200 can be welded to the exterior surface of container 18 with hub 192 projecting into container 18. In either embodiment, the seal between hub 192 and outer casing 188 can be eliminated from retainer 174C because fluid cannot pass between hub 192 and outer casing 188 to flow outside of container 18.

Figure 14:
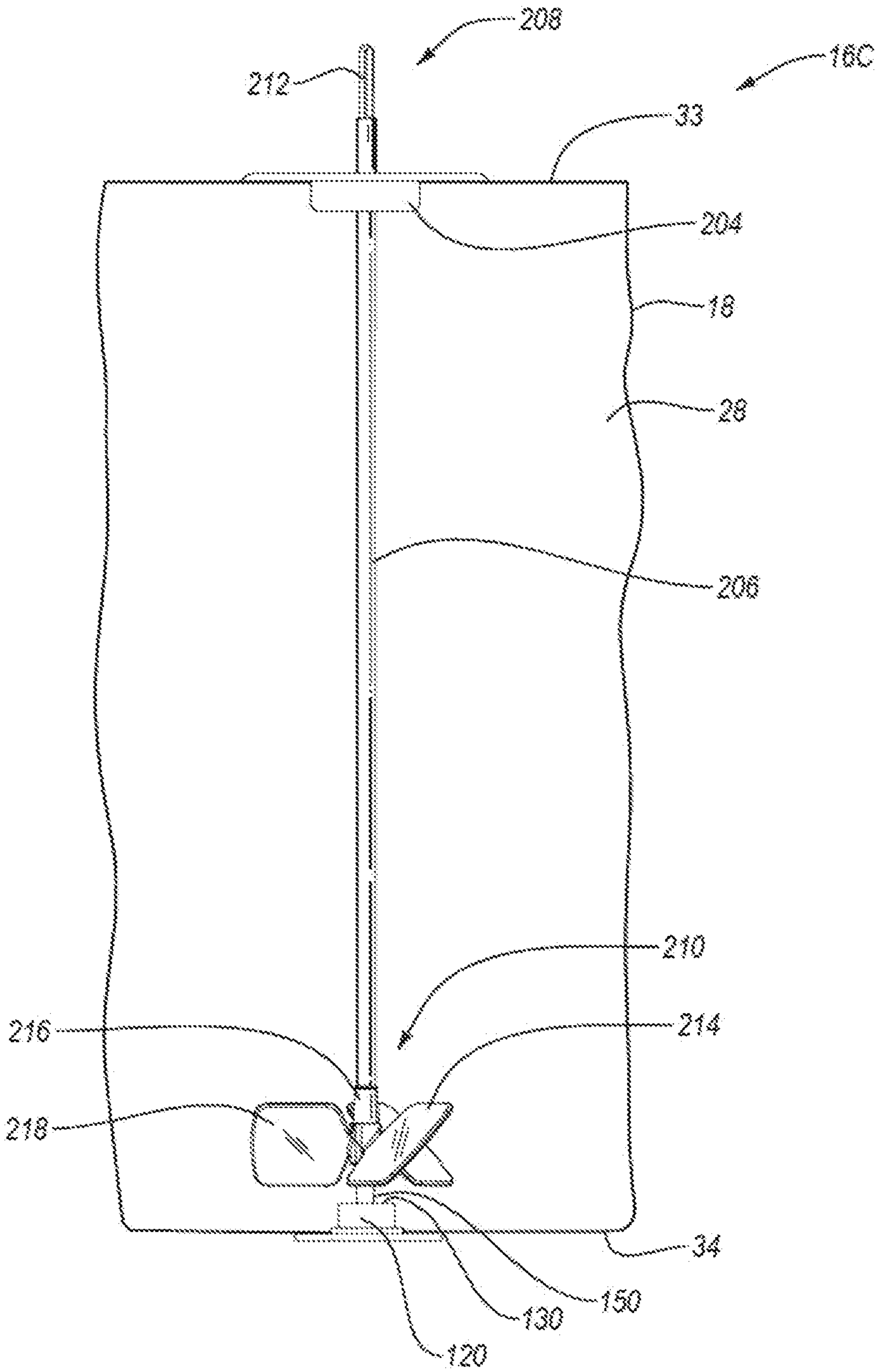
FIG. 14 is a side view of an alternative embodiment of a container assembly having a rigid drive shaft with an impeller and steady support mounted on the end thereof.

The above discussed embodiments use a tubular connector in conjunction with a drive shaft. In alternative embodiments, it is appreciated that the tubular connector can be eliminated. For example, depicted in FIG. 14 is a container assembly 16C that includes container 18. Retainer 120 is mounted on lower end wall 34 and a dynamic seal 204 is mounted on upper end wall 33. A rigid drive shaft 206 passes through dynamic seal 204 and has a first end 208 disposed outside of container 18 and an opposing second end 210 disposed within container 18. Dynamic seal 204 enables drive shaft 206 to freely rotate relative to container 18 while forming an aseptic seal about drive shaft 206. A driver portion 212 or some other engaging surface is formed at first end 208 so that a motor assembly can engage with and rotate drive shaft 206. Mounted on second end 210 of drive shaft 206 is an impeller 214. Impeller 214 includes a hub 216 secured to drive shaft 206, blades 218 outwardly projecting from hub 216 and steady support 150 that projects from hub 216. Steady support 150 can be received within retention cavity 130 of retainer 120 to control lateral movement of impeller 214 and drive shaft 206.

Figure 15:
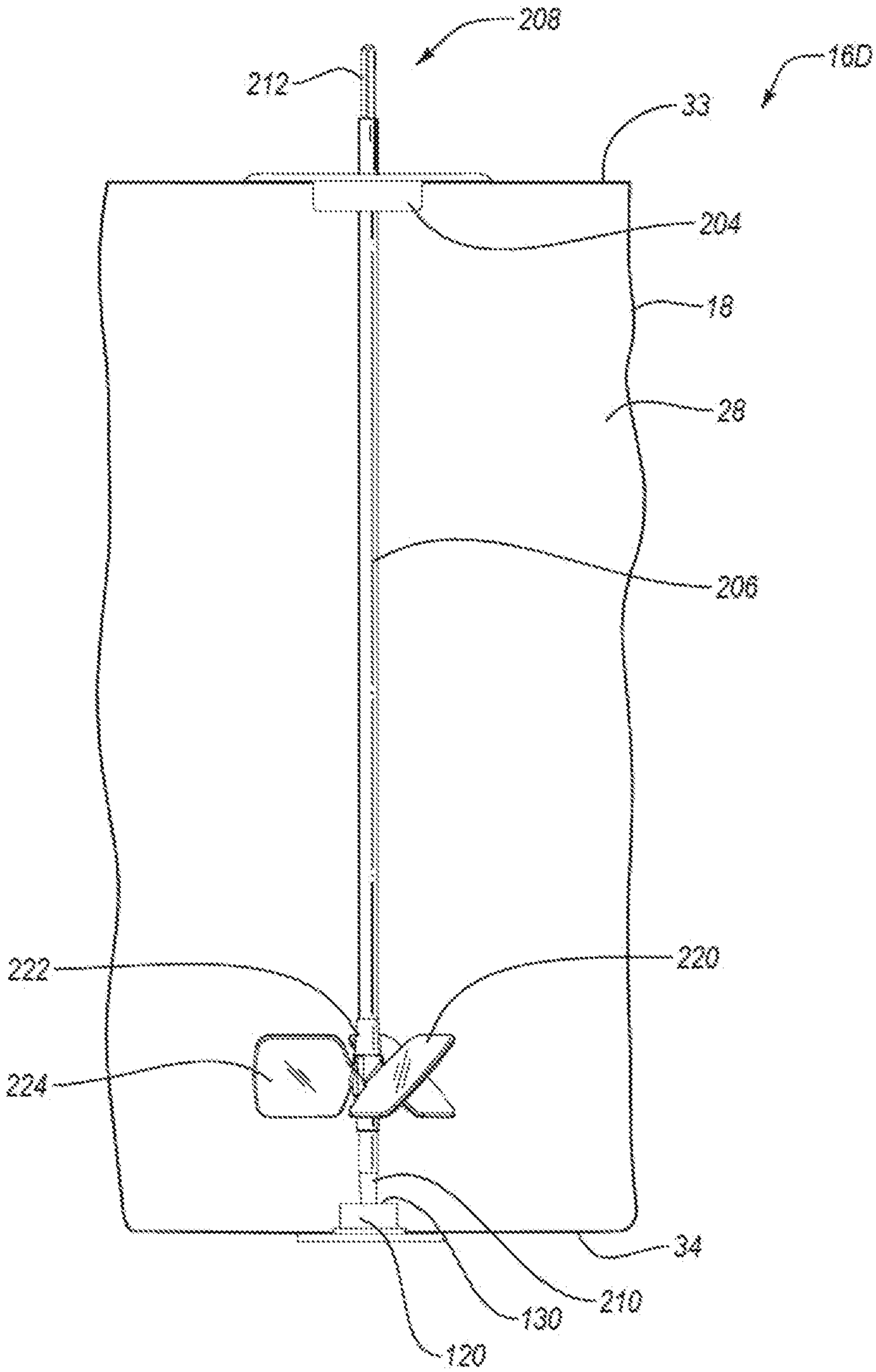
FIG. 15 is a side view of an alternative embodiment of a container assembly having a rigid drive shaft that passes through an impeller and is received within a retainer.

Depicted in FIG. 15 is a container assembly 16D. Like elements between container assembly 16C and container assembly 16D are identified by like reference characters.

Container assembly 16D includes an impeller 220 similar to impeller 68 in FIG. 8. Impeller 220 has a tubular hub 222 having blades 224 outwardly projecting therefrom. Drive shaft 206 passes all the way through impeller 220 so that second end 210 can be received within retention cavity 130 of retainer 120 to control lateral movement of impeller 220 and drive shaft 206.

Figure 16:
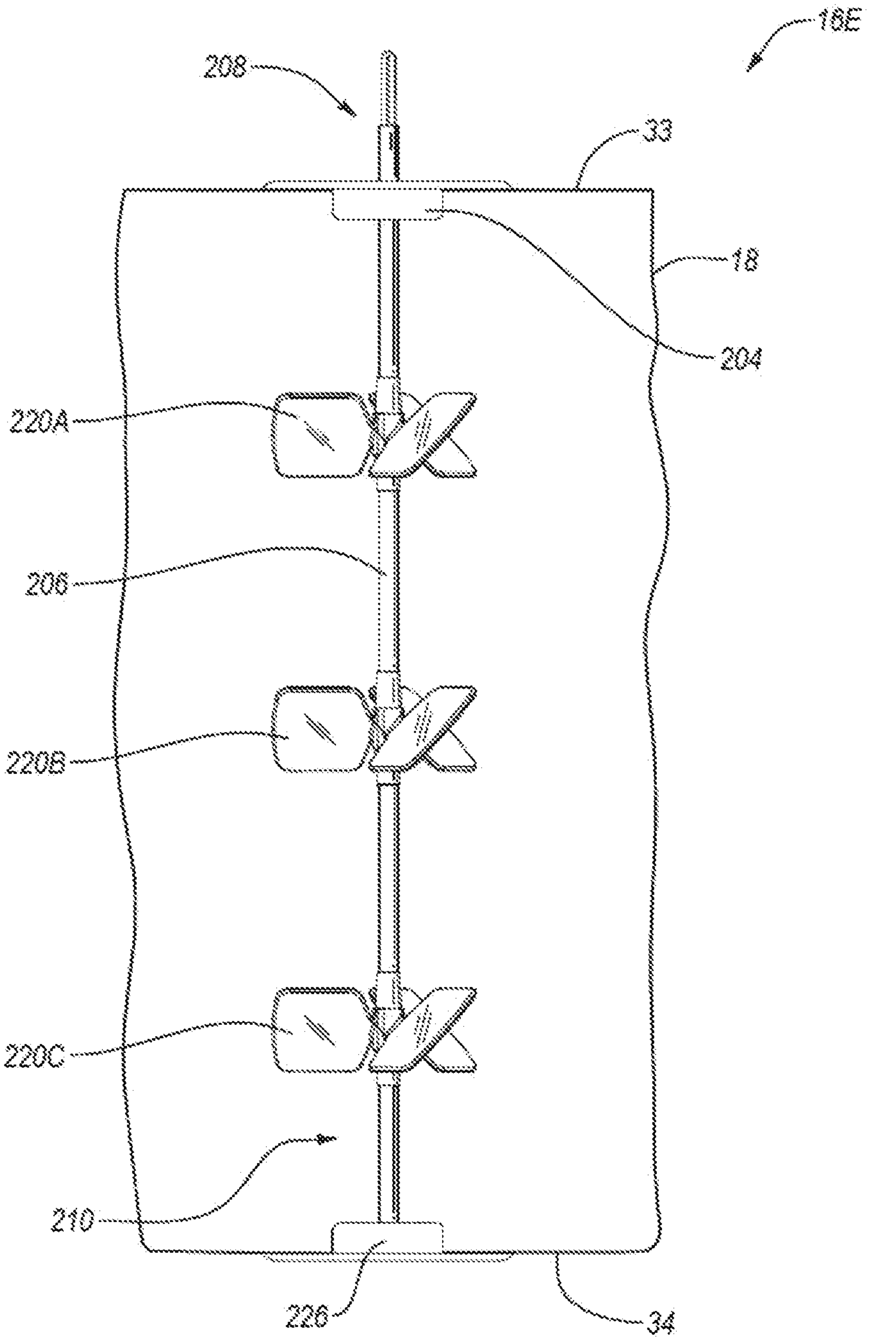
FIG. 16 is a side view of an alternative embodiment of a container assembly wherein a rigid drive shaft couples with a rotatable hub of a retainer.
Figure 17:
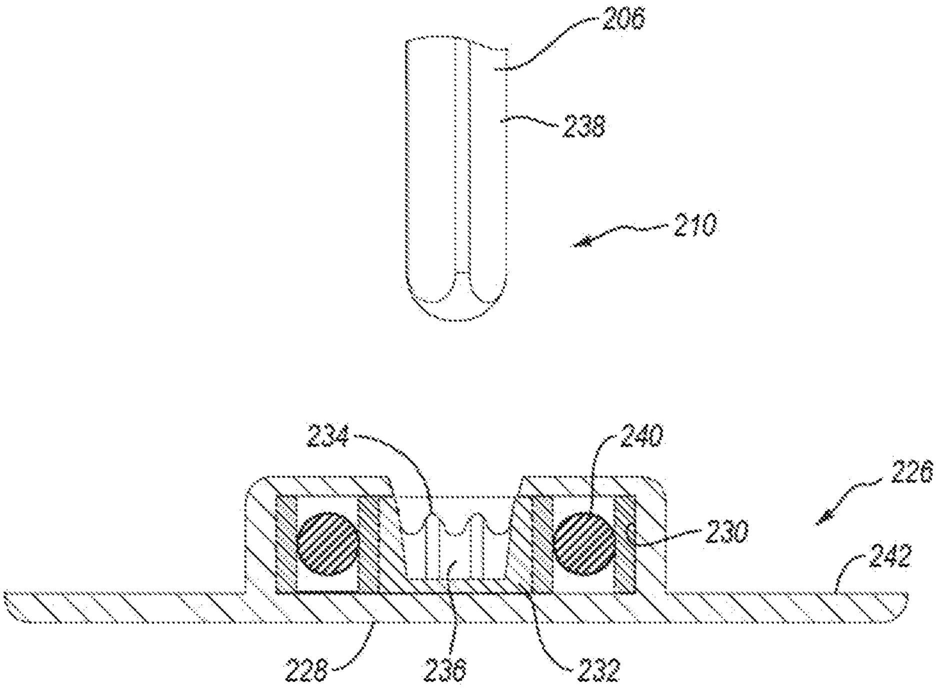
FIG. 17 is a cross sectional side view of the retainer shown in FIG. 16.

Depicted in FIG. 16 is a container assembly 16E. Like elements between container assembly 16D and container assembly 16E are identified by like reference characters. Container assembly 16E includes drive shaft 206 have three separate impellers 220A-C mounted thereon. A retainer 226 is mounted on lower end wall 34 and receives second end 210 of drive shaft 206. As depicted in FIG. 17, retainer 226 comprises an outer casing 228 that bounds a cavity 230 in which a hub 232 is rotatably mounted. Hub 232 has an opening 234 formed thereon having the configuration of a blind socket. At least a portion of the interior surface bounding opening 234 includes a non-circular engaging surface 236 that will couple with driver portion 238 formed on second end 210 of drive shaft 206. A bearing 240 can be positioned within cavity 230 between outer casing 228 and hub 232 to facilitate easy rotation of hub 232. Outer casing 228 has an annular flange 242 which can be secured to the interior surface of container 18 or a hole can be formed on container 18 and flange 242 can be secured to the exterior surface of container 18 with hub 232 projecting into container 18. In this embodiment, second end 210 of drive shaft 206 can be received within hub 232 during use to control lateral movement of drive shaft 206 and impellers 220A-C.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for mixing a fluid, the method comprising:

inserting a container assembly into a chamber of a support housing, the container assembly comprising:

a flexible bag having a first end, an opposing second end, and an interior surface bounding a compartment;

a first rotational assembly comprising a first casing securely mounted to the first end of the flexible bag and a first hub rotatably mounted to the first casing, at least a portion of the first hub being encircled by the first casing, the first hub having a first opening extending therethrough, a second rotational assembly comprising a second casing having a closed wall mounted to the interior surface at the second end of the flexible bag and a second hub rotatably mounted to the second casing, the second hub having a stem and a flange radially outwardly projecting from the stem and a closed floor wall;

an elongated member having a first end coupled with the first hub and an opposing second end coupled with the second hub; and a first impeller mounted to the elongated member, and rotating the elongated member within the flexible bag to mix the fluid.

2. The method as recited in claim 1, wherein rotating the elongated member causes mixing of a biological suspension disposed within the compartment of the flexible bag, the biological suspension comprising cells or microorganisms suspended within a nutrient growth medium.

3. The method as recited in claim 1, wherein the first impeller comprises a central hub with a plurality of blades radially outwardly projecting.

4. The method as recited in claim 3, wherein the blades are integrally formed as a unitary structure with the central hub.

5. The method as recited in claim 3, wherein the blades are removably attached to the central hub.

6. The method as recited in claim 1, further comprising mounting a second impeller to the elongated member.

7. The method as recited in claim 6, wherein the second impeller is spaced apart from the first impeller.

8. The method as recited in claim 1, wherein the container comprises a flexible bag that is comprised of one or more sheets of polymeric film.

9. The method as recited in claim 1, wherein the stem of the second hub comprises a second opening extending therethrough.

10. The method as recited in claim 1, wherein the elongated member engages the first hub, the second hub, and the impeller.

11. The method as recited in claim 1, wherein the first casing and the first hub are spaced by a first bearing assembly.

12. The method as recited in claim 11, wherein the second casing and the second hub are spaced by a second bearing assembly.

13. The method as recited in claim 1, wherein the closed wall of the second casing does not have an aperture.

14. The method as recited in claim 1, wherein the elongated member extends as a continuous unitary member between the first and second ends.

15. The method as recited in claim 14, wherein the elongated member comprises a drive shaft.

* * * * *